US012597341B2

(12) United States Patent
Umehara

(10) Patent No.: US 12,597,341 B2
(45) Date of Patent: Apr. 7, 2026

(54) INSTALLATION SUPPORT DEVICE FOR RADIO WAVE SENSOR, COMPUTER PROGRAM, METHOD OF DETERMINING INSTALLATION POSITION OF RADIO WAVE SENSOR, AND METHOD OF SUPPORTING INSTALLATION OF RADIO WAVE SENSOR

(71) Applicant: Sumitomo Electric Industries, Ltd., Osaka (JP)

(72) Inventor: Shigeki Umehara, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 147 days.

(21) Appl. No.: 18/726,136

(22) PCT Filed: Dec. 15, 2022

(86) PCT No.: PCT/JP2022/046126

§ 371 (c)(1),
(2) Date: Jul. 2, 2024

(87) PCT Pub. No.: WO2023/136039

PCT Pub. Date: Jul. 20, 2023

(65) Prior Publication Data

US 2025/0078653 A1 Mar. 6, 2025

(30) Foreign Application Priority Data

Jan. 13, 2022 (JP) ................................ 2022-003555

(51) Int. Cl.
*G08G 1/04* (2006.01)
*G08G 1/01* (2006.01)

(52) U.S. Cl.
CPC ............ *G08G 1/04* (2013.01); *G08G 1/0116* (2013.01); *G08G 1/0137* (2013.01)

(58) Field of Classification Search
None
See application file for complete search history.

(56) References Cited

U.S. PATENT DOCUMENTS

2022/0130254 A1* 4/2022 Austin .................... H04W 4/46
2024/0027605 A1* 1/2024 Goldhammer ........... G08G 1/04
(Continued)

FOREIGN PATENT DOCUMENTS

JP H09-218043 A 8/1997
JP 2012103191 A * 5/2012
(Continued)

*Primary Examiner* — Gelek W Topgyal
(74) *Attorney, Agent, or Firm* — XSENSUS LLP

(57) ABSTRACT

This installation assisting device for a radio wave sensor includes: a target position determining unit that determines, in an image including a crosswalk, the target position for emission of radio waves by the radio wave sensor; a candidate position specification unit that receives, from a user, a candidate position, which is a candidate for an installation position of the radio wave sensor, designated within the image; a radio wave emission area defined on the basis of the target position and the candidate position; an evaluation unit that evaluates the candidate position on the basis of a first area of the crosswalk in the image; and a display control unit that causes a display device to display evaluation results from the evaluation unit.

13 Claims, 27 Drawing Sheets

(56) References Cited

U.S. PATENT DOCUMENTS

| | | | | |
|---|---|---|---|---|
| 2024/0103157 | A1* | 3/2024 | Higashida | G08G 1/01 |
| 2025/0060479 | A1* | 2/2025 | Umehara | G01S 13/91 |

FOREIGN PATENT DOCUMENTS

| | | | | | |
|---|---|---|---|---|---|
| JP | 2013-097532 | A | | 5/2013 | |
| JP | 2015-068746 | A | | 4/2015 | |
| JP | 2023094087 | A | * | 7/2023 | |
| WO | WO-2021117304 | A1 | * | 6/2021 | G08G 1/01 |
| WO | WO-2022168387 | A1 | * | 8/2022 | G08G 1/04 |

* cited by examiner

INSTALLATION SUPPORT DEVICE FOR RADIO WAVE SENSOR, COMPUTER PROGRAM, METHOD OF DETERMINING INSTALLATION POSITION OF RADIO WAVE SENSOR, AND METHOD OF SUPPORTING INSTALLATION OF RADIO WAVE SENSOR

CROSS-REFERENCE TO RELATED APPLICATIONS

This application is a national stage application, pursuant to 35 U.S.C. § 371, of International Patent Application No. PCT/JP2022/046126, filed on Dec. 15, 2022, which claims the priority to the Japanese Patent Application No. 2022-003555, filed on Jan. 13, 2022, the entire contents of each are incorporated herein by reference.

TECHNICAL FIELD

The present disclosure relates to an installation support device for a radio wave sensor, a computer program, a method of determining an installation position of a radio wave sensor, and a method of supporting installation of a radio wave sensor.

BACKGROUND ART

Patent literature 1 discloses an axis adjustment device that performs axis adjustment of an in-vehicle radar mounted on a vehicle.

CITATION LIST

Patent Literature

Patent literature 1: Japanese Unexamined Patent Application Publication No. 2015-68746

SUMMARY OF INVENTION

An installation support device for a radio wave sensor according to an aspect of the present disclosure includes a target position determination unit configured to determine a target position of irradiation with a radio wave by the radio wave sensor in an image including a crosswalk; a candidate position designation unit configured to receive, from a user, designation of a candidate position that is a candidate installation position of the radio wave sensor in the image; an evaluation unit configured to evaluate the candidate position based on a radio wave irradiation area determined based on the target position and the candidate position, and a first area of the crosswalk in the image; and a display control unit configured to cause a display device to display an evaluation result obtained by the evaluation unit.

A computer program according to an aspect of the present disclosure is a computer program for causing a computer to support installation of a radio wave sensor. The computer program causes the computer to function as a target position determination unit configured to determine a target position of irradiation with a radio wave by the radio wave sensor in an image including a crosswalk; a candidate position designation unit configured to receive, from a user, designation of a candidate position that is a candidate installation position of the radio wave sensor in the image; an evaluation unit configured to evaluate the candidate position based on a radio wave irradiation area determined based on the target position and the candidate position, and a first area of the crosswalk in the image; and a display control unit configured to cause a display device to display an evaluation result obtained by the evaluation unit.

A method of determining an installation position of a radio wave sensor according to an aspect of the present disclosure includes designating a candidate position that is a candidate installation position of the radio wave sensor, in an image including a crosswalk displayed on an installation support device configured to support installation of the radio wave sensor; and determining whether to determine the candidate position as an installation position of the radio wave sensor, based on a result of evaluation of the candidate position by the installation support device based on a radio wave irradiation area determined based on the candidate position and a target position of irradiation with a radio wave by the radio wave sensor, and a first area of the crosswalk in the image.

A method of supporting installation of a radio wave sensor according to an aspect of the present disclosure includes designating a target position of irradiation with a radio wave by the radio wave sensor in an image including a crosswalk; designating a candidate position that is a candidate installation position of the radio wave sensor in the image; causing an installation support device configured to support installation of the radio wave sensor to perform an evaluation of the candidate position based on a radio wave irradiation area determined based on the target position and the candidate position, and a first area of the crosswalk in the image; and causing a display device to display a result of the evaluation.

DETAILED DESCRIPTION

Figure 1:
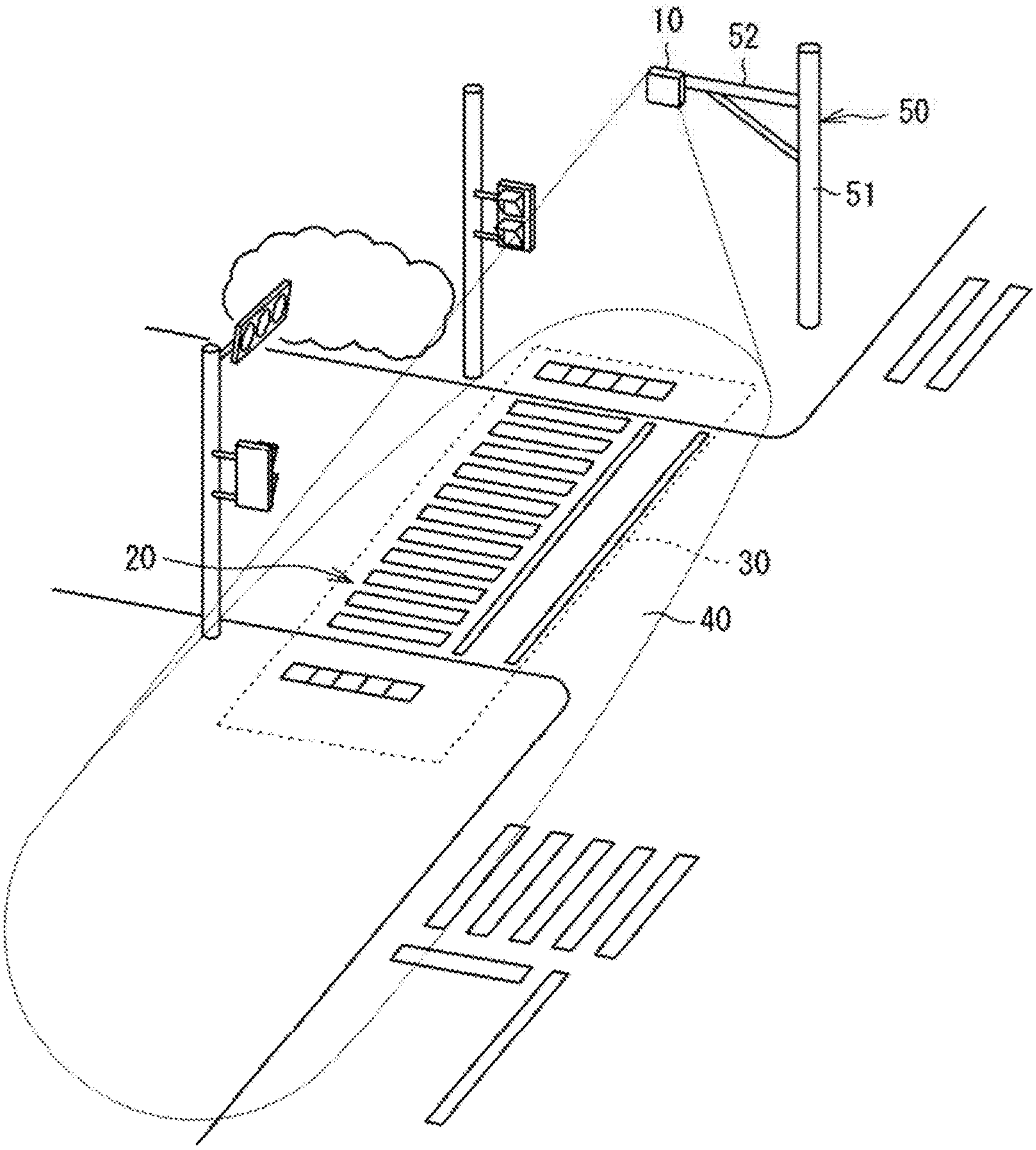
FIG. 1 is a diagram showing an example of use of an infrastructure radio wave sensor according to an embodiment.

Problems to be Solved by Present Disclosure

A driving safety support system (DSSS) provides, for example, vehicle information and pedestrian information at an intersection with poor visibility to a traveling vehicle through road-to-vehicle communication, and calls a driver's attention to prevent a traffic accident. For the purpose of such traffic monitoring, a radio wave sensor (hereinafter, also referred to as an "infrastructure radio wave sensor") is installed on a road or at an intersection. In particular, an infrastructure radio wave sensor that detects a pedestrian on a crosswalk is installed near an intersection, and many objects such as utility poles, traffic signals, traffic signal controllers, buildings, and trees, which are obstacles to installation, are present near the intersection. Since the area that can be irradiated with a radio wave varies depending on the position of the infrastructure radio wave sensor, there are positions that are not suitable for installation. In order to determine an installation position of the infrastructure radio wave sensor, a worker observes the site and determines a position suitable for installation. Thus, the decision of the installation position of the infrastructure radio wave sensor is left to the skill of the worker, and much cost and time are required.

Effects of Present Disclosure

According to the present disclosure, information useful for installation of an infrastructure radio wave sensor can be provided to a user.

Overview of Embodiments of Present Disclosure

An overview of embodiments according to the present disclosure is listed and described below.

(1) An installation support device for a radio wave sensor according to an embodiment of the present disclosure includes a target position determination unit configured to determine a target position of irradiation with a radio wave by the radio wave sensor in an image including a crosswalk; a candidate position designation unit configured to receive, from a user, designation of a candidate position that is a candidate installation position of the radio wave sensor in the image; an evaluation unit configured to evaluate the candidate position based on a radio wave irradiation area determined based on the target position and the candidate position, and a first area of the crosswalk in the image; and a display control unit configured to cause a display device to display an evaluation result obtained by the evaluation unit. With this configuration, the candidate position can be evaluated based on the radio wave irradiation area in a case where the radio wave sensor is installed at the candidate position and a direction of irradiation with a radio wave is directed to a target position, and the evaluation result can be provided to a user. Thus, information useful for installation of the radio wave sensor can be provided to the user.

(2) The first area may be a planned detection area planned to be set by the radio wave sensor as a detection area for the radio wave sensor to detect an object. The installation support device may further include an area determination unit configured to determine the planned detection area based on the image. With this configuration, the planned detection area for the radio wave sensor to detect the pedestrian on the crosswalk can be determined based on the image, and the candidate position can be evaluated based on the planned detection area.

(3) The area determination unit may be configured to receive designation of a point for defining the planned detection area in the image from the user and determine the planned detection area based on the point. This allows the user to define the planned detection area.

(4) The evaluation unit may be configured to calculate an overall coverage rate that is a ratio of a portion where the planned detection area and the radio wave irradiation area overlap each other to the planned detection area and evaluate the candidate position based on the overall coverage rate. With this configuration, an overall coverage rate indicating how much the planned detection area is covered by the radio wave irradiation area is calculated, and the candidate position can be accurately evaluated based on the overall coverage rate.

(5) The evaluation unit may be configured to determine a rank of the candidate position, based on a comparison between the overall coverage rate and a threshold. The display control unit may be configured to cause the display device to display the evaluation result including the rank. With this configuration, the candidate positions can be ranked in accordance with the overall coverage rate, and the rank of the candidate positions can be presented to the user.

(6) The area determination unit may be configured to determine the planned detection area including a plurality of sub-areas. The evaluation unit is configured to calculate a partial coverage rate for each of the plurality of sub-areas included in the planned detection area and determine a rank of the candidate position, based on the partial coverage rate for each of the plurality of sub-areas. The partial coverage rate is a ratio of a portion where each of the plurality of sub-areas and the radio wave irradiation area overlap each other to each of the sub-areas. With this configuration, the candidate position can be evaluated in detail for each of the plurality of sub-areas included in the planned detection area.

(7) The evaluation unit may be configured to determine a rank of the candidate position, based on a positional relationship between the candidate position and the planned detection area. Depending on the planned detection area, there are positions suitable for installation of the radio wave sensor and positions unsuitable for installation of the radio wave sensor. With the above configuration, it is possible to determine the rank in consideration of the positional relationship between the candidate position and the planned detection area.

(8) The candidate position designation unit may be configured to receive designation of a plurality of the candidate positions from the user. The evaluation unit may be configured to evaluate each of the plurality of candidate positions. The display control unit may be configured to cause the display device to display an evaluation result of each of the plurality of candidate positions. With this configuration, the plurality of candidate positions can be collectively evaluated, and the evaluation results of the candidate positions can be collectively presented to the user.

(9) The candidate position designation unit may be configured to receive, from the user, designation of a second area including the plurality of candidate positions in the image. The display control unit may be configured to display the evaluation result of each of the plurality of candidate positions in the second area. With this configuration, the user can designate the plurality of candidate positions by designating the second area. Furthermore, the evaluation results of the candidate positions can be displayed collectively in the second area.

(10) The installation support device may further includes a form creation unit configured to create a form for installing the radio wave sensor at the candidate position, based on the target position determined by the target position determination unit and the candidate position received by the candidate position designation unit, and an output unit configured to output the form created by the form creation unit. With this configuration, the worker who installs the radio wave sensor can be supported by means of the output form.

(11) A computer program according to an embodiment of the present disclosure is a computer program for causing a computer to support installation of a radio wave sensor. The computer program causes the computer to function as a target position determination unit configured to determine a target position of irradiation with a radio wave by the radio wave sensor in an image including a crosswalk; a candidate position designation unit configured to receive, from a user, designation of a candidate position that is a candidate installation position of the radio wave sensor in the image; an evaluation unit configured to evaluate the candidate position based on a radio wave irradiation area determined based on the target position and the candidate position, and a first area of the crosswalk in the image; and a display control unit configured to cause a display device to display an evaluation result obtained by the evaluation unit. With this configuration, the candidate position can be evaluated based on the radio wave irradiation area in a case where the radio wave sensor is installed at the candidate position and a direction of irradiation with a radio wave is directed to a target position, and the evaluation result can be provided to a user. Thus, information useful for installation of the radio wave sensor can be provided to the user.

(12) A method of determining an installation position of a radio wave sensor according to an aspect of the present disclosure includes designating a candidate position that is a candidate installation position of the radio wave sensor, in an image including a crosswalk displayed on an installation support device configured to support installation of the radio wave sensor; and determining whether to determine the candidate position as an installation position of the radio wave sensor, based on a result of evaluation of the candidate position by the installation support device based on a radio wave irradiation area determined based on the candidate position and a target position of irradiation with a radio wave by the radio wave sensor, and a first area of the crosswalk in the image. With this configuration, the user can designate the candidate position to the installation support device and cause the installation support device to evaluate the candidate position. In addition, the user can determine the installation position using the evaluation result of the candidate position by the installation support device.

(13) A method of supporting installation of a radio wave sensor according to an aspect of the present disclosure includes designating a target position of irradiation with a radio wave by the radio wave sensor in an image including a crosswalk; designating a candidate position that is a candidate installation position of the radio wave sensor in the image; causing an installation support device configured to support installation of the radio wave sensor to perform an evaluation of the candidate position based on a radio wave irradiation area determined based on the target position and the candidate position, and a first area of the crosswalk in the image; and causing a display device to display a result of the evaluation. With this configuration, the candidate position can be evaluated based on the radio wave irradiation area in a case where the radio wave sensor is installed at the candidate position and a direction of irradiation with a radio wave is directed to a target position, and the evaluation result can be provided to a user. Thus, information useful for installation of the radio wave sensor can be provided to the user.

The present disclosure can be implemented not only as the installation support device for a radio wave sensor having the characteristic configurations as described above and a computer program for causing a computer to function as the installation support device, but also as a method of supporting installation of an infrastructure radio wave sensor having the characteristic processings as steps, and as an installation support system for a radio wave sensor including the installation support device.

Details of Embodiments of Present Disclosure

Hereinafter, embodiments of the present invention will be described in detail with reference to the drawings. At least a part of the embodiments described below may be combined as desired.

[1. Infrastructure Radio Wave Sensor]

FIG. 1 is a diagram showing an example of use of an infrastructure radio wave sensor according to an embodiment. An infrastructure radio wave sensor 10 according to the embodiment of the present disclosure is a radio wave radar for traffic monitoring, and detects a pedestrian on a crosswalk 20. Infrastructure radio wave sensor 10 is, for example, a millimeter wave radar.

Infrastructure radio wave sensor 10 is mounted on a structure 50 provided on a road. Structure 50 has a height of several meters, and infrastructure radio wave sensor 10 is installed at a height of several meters above the ground. Structure 50 includes, for example, a pole 51 and an arm 52 provided near the upper end of pole 51. Infrastructure radio wave sensor 10 is mounted on arm 52.

Infrastructure radio wave sensor 10 radiates a radio wave (millimeter wave) onto crosswalk 20 and receives a reflected wave thereof to detect an object (for example, a pedestrian or a bicycle) on crosswalk 20. More specifically, infrastructure radio wave sensor 10 can detect a distance from infrastructure radio wave sensor 10 to the object on crosswalk 20, a speed of the object, and a horizontal angle (an azimuth angle) of a position where the object exists with respect to an axis of irradiation with a radio wave.

A detection area 30 is set on a road as an area where infrastructure radio wave sensor 10 detects the object. Detection area 30 is a part of a radio wave irradiation area 40. That is, radio wave irradiation area 40 covers detection area 30. In order for infrastructure radio wave sensor 10 to monitor the traffic situation of entire crosswalk 20, it is preferable that detection area 30 including entire crosswalk 20 is set. In the present embodiment, radio wave irradiation area 40 is an area in which the object reflects a radio wave radiated by infrastructure radio wave sensor 10 and infrastructure radio wave sensor 10 can detect the object by the reflected wave from the object. Even in an area on which infrastructure radio wave sensor 10 can radiate a radio wave, an area where infrastructure radio wave sensor 10 cannot detect an object is not included in radio wave irradiation area 40. However, radio wave irradiation area 40 is not limited to the above area, and may be the entire area on which infrastructure radio wave sensor 10 can radiate a radio wave.

The radio wave irradiation area varies depending on the position where infrastructure radio wave sensor 10 is installed and the direction in which infrastructure radio wave sensor 10 faces (hereinafter, referred to as an angle of infrastructure radio wave sensor 10). Thus, in order to appropriately set detection area 30 including entire crosswalk 20, it is necessary that infrastructure radio wave sensor 10 is installed at an appropriate position and the angle of infrastructure radio wave sensor 10 is an appropriate angle. In the present embodiment, an installation support device supports in determining the position where infrastructure radio wave sensor 10 is installed and the angle of infrastructure radio wave sensor 10.

[2. Configuration of Installation Support Device]

Figure 2:
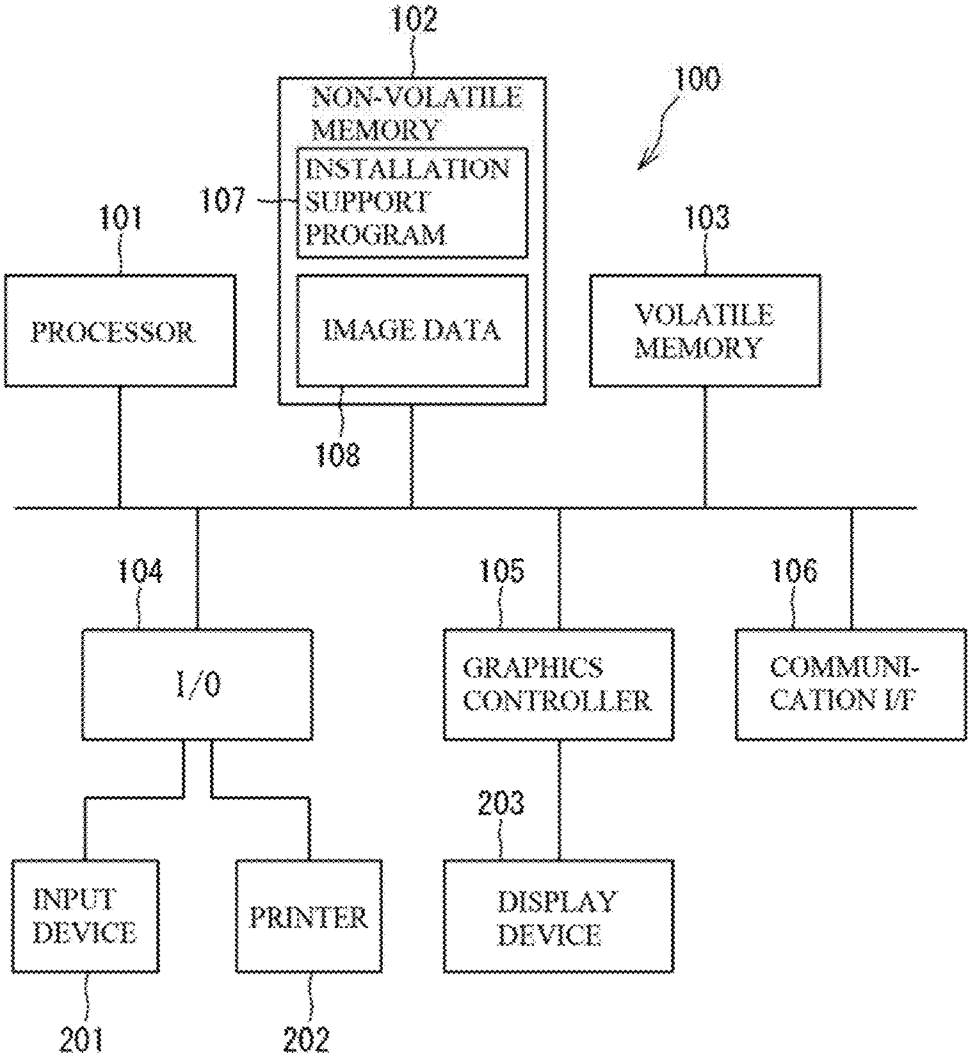
FIG. 2 is a block diagram showing an example of a hardware configuration of an installation support device according to the embodiment.

FIG. 2 is a block diagram showing an example of a hardware configuration of an installation support device according to the present embodiment. An installation support device 100 according to the present embodiment is used by a user to determine an installation position of infrastructure radio wave sensor 10 and an angle of infrastructure radio wave sensor 10. Installation support device 100 includes a processor 101, a non-volatile memory 102, a volatile memory 103, an input/output interface (I/O) 104, a graphics controller 105, and a communication interface (communication I/F) 106. Installation support device 100 further includes an input device 201, a printer 202, and a display device 203.

Volatile memory 103 is a semiconductor memory such as a static random access memory (SRAM) or a dynamic random access memory (DRAM). Non-volatile memory 102 is, for example, a flash memory, a hard disk, or a read only memory (ROM). Non-volatile memory 102 stores an installation support program 107, which is a computer program, and data used for executing installation support program 107 such as image data (an image file) 108. Installation support device 100 is configured to include a computer, and each function of installation support device 100 is achieved by processor 101 executing installation support program 107 which is a computer program stored in a storage unit of the computer. Installation support program 107 may be stored in a recording medium such as a flash memory, a ROM, or a CD-ROM. Processor 101 supports the user to determine the installation position of infrastructure radio wave sensor 10 and the angle of infrastructure radio wave sensor 10 with installation support program 107.

Processor 101 is, for example, a central processing unit (CPU). However, processor 101 is not limited to the CPU. Processor 101 may be a graphics processing unit (GPU). Processor 101 may be, for example, an application specific integrated circuit (ASIC) or a programmable logic device such as a gate array or a field programmable gate array (FPGA). In this case, the ASIC or the programmable logic device is configured to be able to execute the same processing as installation support program 107.

For example, input device 201 includes a keyboard and a pointing device such as a mouse. Input device 201 may be a capacitive or pressure-sensitive touch pad superimposed on the screen of display device 203. Input device 201 is used to input data to installation support device 100. I/O 104 is connected to input device 201 and printer 202. I/O 104 receives input data from input device 201 and provides the received data to processor 101. Furthermore, I/O 104 outputs a print command and data necessary for printing from processor 101 to printer 202. Printer 202 performs printing in accordance with the input print command and data.

Display device 203 includes, for example, a liquid crystal panel or an organic electroluminescence (OEL) panel. Display device 203 can display characters or graphics. Graphics controller 105 is connected to display device 203 and controls a display on display device 203. Graphics controller 105 includes, for example, a GPU and a video RAM (VRAM), stores data to be displayed on display device 203 in the VRAM, periodically reads video data for one frame from the VRAM, and generates a video signal. The generated video signal is output to display device 203, and the video is displayed on display device 203. The functions of graphics controller 105 may be included in processor 101. A part of the area of volatile memory 103 may be used as a VRAM.

Communication I/F 106 can communicate with an external device. Communication I/F 106 can transmit information including the installation position and the angle of infrastructure radio wave sensor 10 determined using installation support device 100 to a server or a terminal device.

[3. Function of Installation Support Device]

Figure 3:
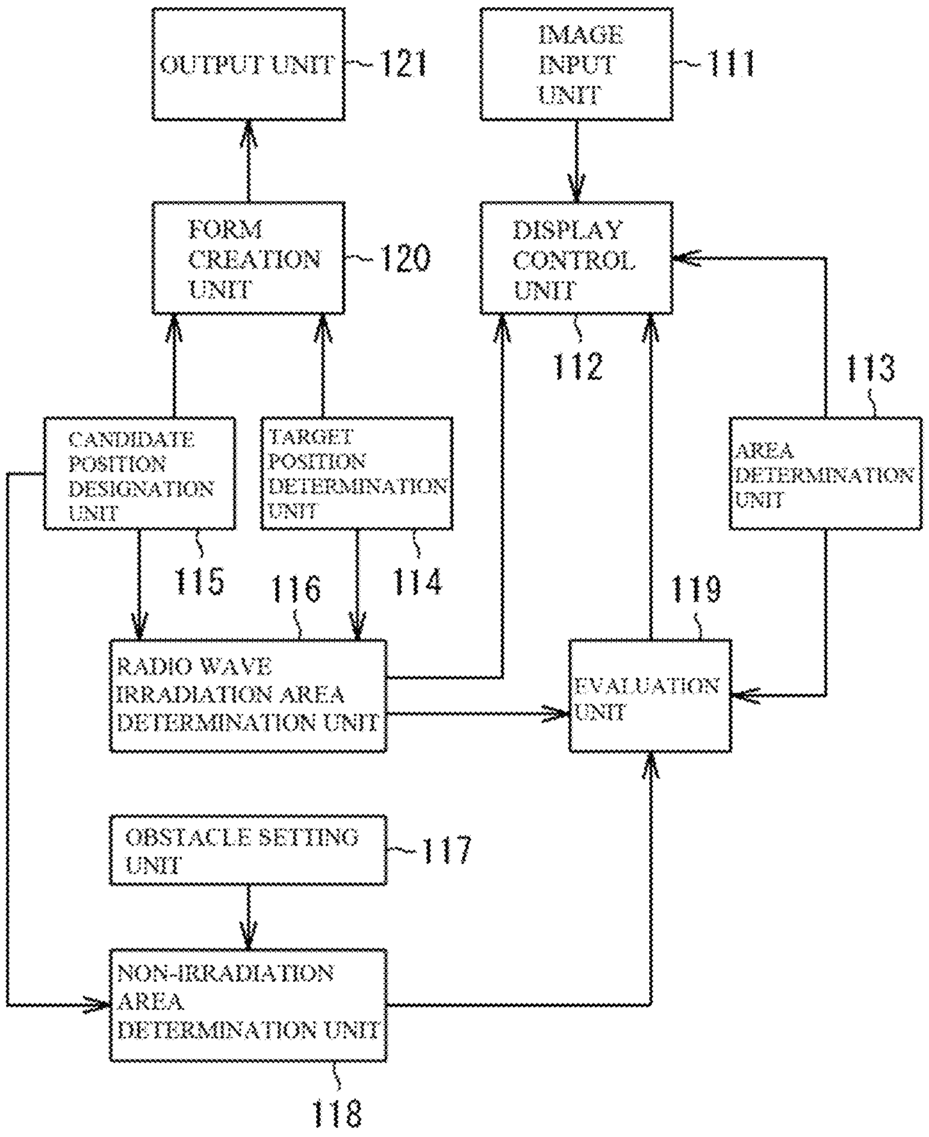
FIG. 3 is a functional block diagram showing an example of a function of the installation support device according to the embodiment.

FIG. 3 is a functional block diagram showing an example of a function of the installation support device according to the present embodiment. Processor 101 executes installation support program 107, so that installation support device 100 functions as an image input unit 111, a display control unit 112, an area determination unit 113, a target position determination unit 114, a candidate position designation unit 115, a radio wave irradiation area determination unit 116, an obstacle setting unit 117, a non-irradiation area determination unit 118, an evaluation unit 119, a form creation unit 120, and an output unit 121.

Image input unit 111, area determination unit 113, target position determination unit 114, candidate position designation unit 115, radio wave irradiation area determination unit 116, obstacle setting unit 117, non-irradiation area determination unit 118, evaluation unit 119, and form creation unit 120 are mainly implemented by processor 101. Display control unit 112 is mainly implemented by graphics controller 105. Output unit 121 is mainly implemented by I/O 104.

Image input unit 111 receives input of image data 108 including a crosswalk. Display control unit 112 causes display device 203 to display an installation position determination screen including input image data 108. Image data 108 is data of an image including the crosswalk, and is, for example, data of a photograph of the crosswalk. However, image data 108 is not limited to the photograph data, and may be, for example, map data including the crosswalk or drawing data of the crosswalk used for road construction.

Figure 4A:
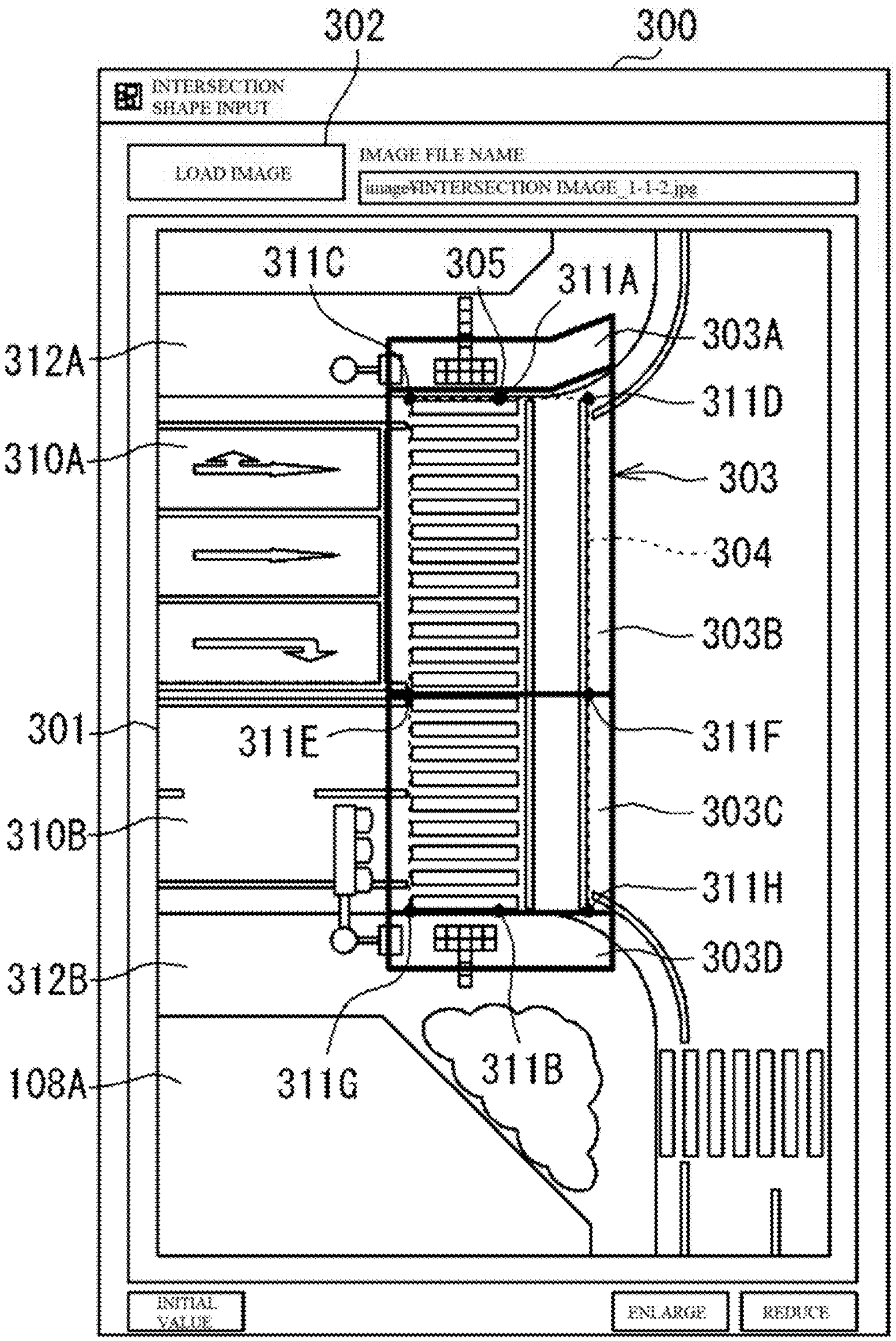
FIG. 4A is a diagram showing a left portion of an example of an installation position determination screen on which an image including a crosswalk is displayed.
Figure 4B:
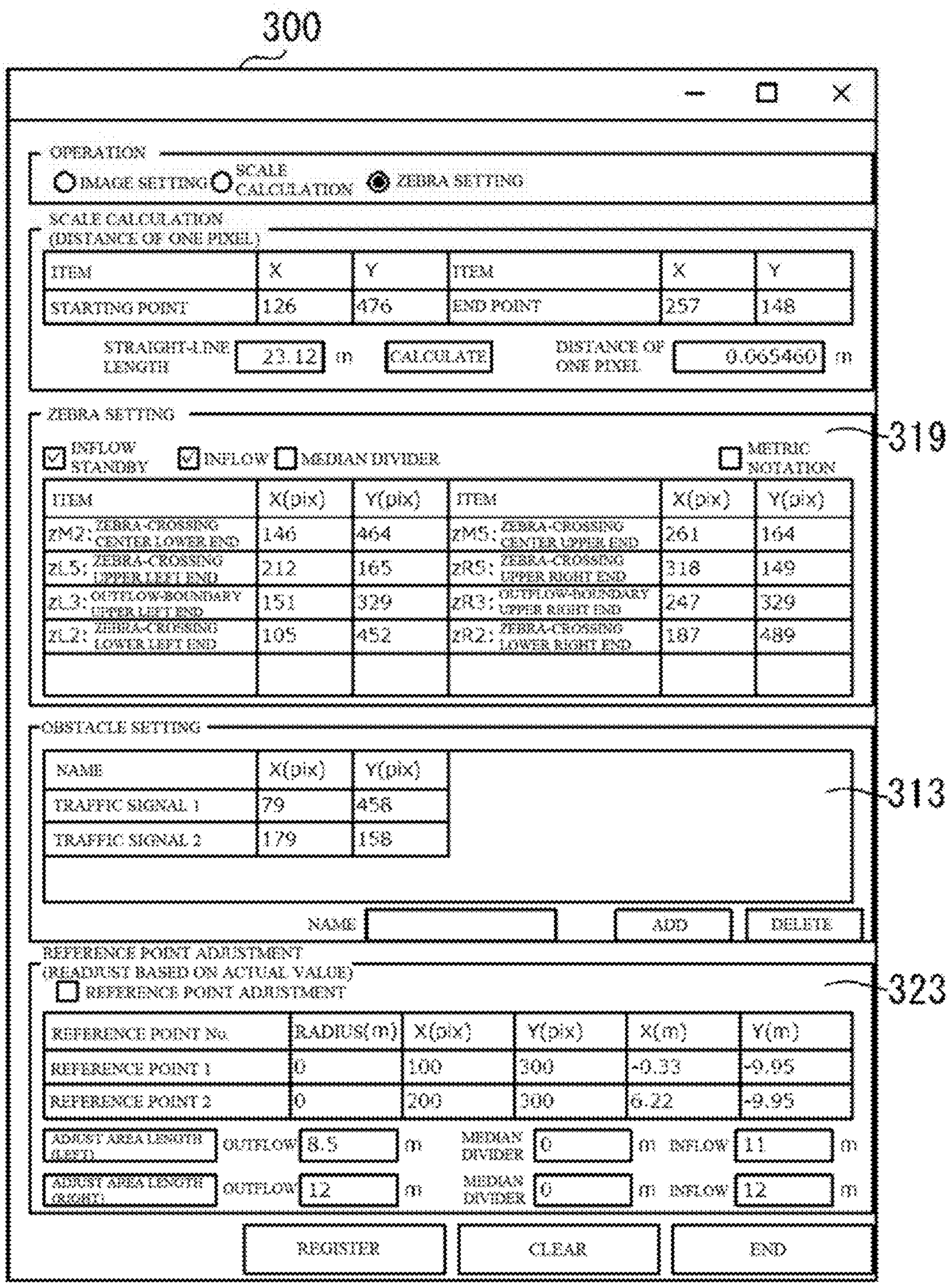
FIG. 4B is a diagram showing a right portion of an example of the installation position determination screen on which an image including a crosswalk is displayed.
Figure 5:
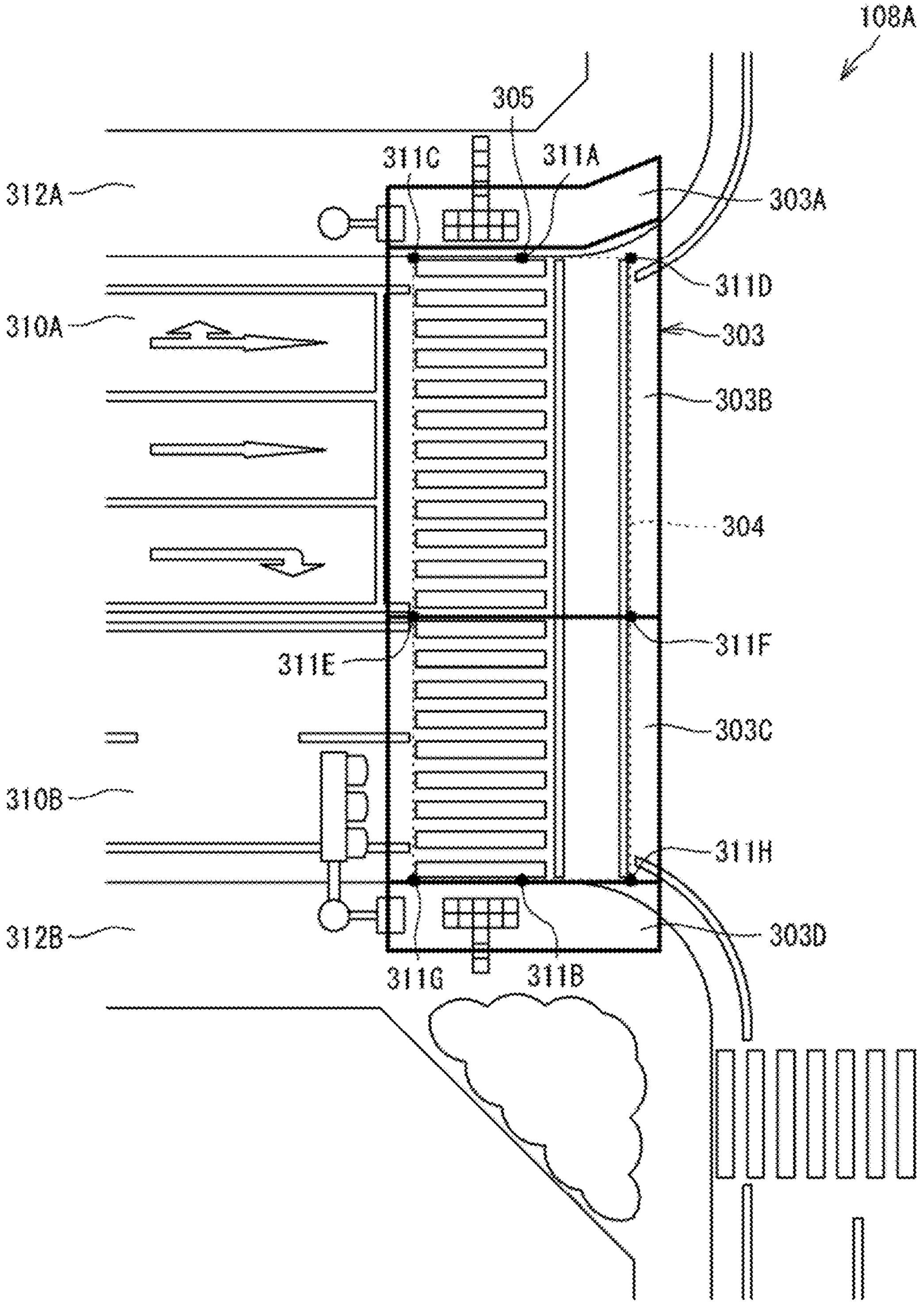
FIG. 5 is an enlarged view showing an image displayed on the installation position determination screen in FIG. 4A.

FIG. 4A is a diagram showing a left portion of an example of the installation position determination screen on which an image including a crosswalk is displayed, and FIG. 4B is a diagram showing a right portion of an example of the installation position determination screen on which an image including a crosswalk is displayed. FIG. 5 is an enlarged view showing an image displayed on the installation position determination screen in FIG. 4A. An installation position determination screen 300 includes a display area 301 for the input image. In the example of FIG. 4A and FIG. 4B, display area 301 is an area in a left portion of installation position determination screen 300. For example, a button 302 for instructing loading of an image is provided in a vicinity of display area 301. The user can display a window (not shown) for selecting image data 108 by providing an operation of selecting button 302 on input device 201. The user can designate image data 108 to be input by selecting image data 108 from the window. When the user designates image data 108, image input unit 111 receives the input of image data 108.

Referring to FIG. 3, area determination unit 113 determines a planned detection area 303 based on a displayed image 108A. Referring to FIG. 5, planned detection area 303 is an area which is planned as a detection area for infrastructure radio wave sensor 10 to detect an object. On installation position determination screen 300, coordinates of image 108A are defined in advance. The origin of the coordinates is, for example, a point at an upper left corner of image 108A, and an X axis extending from the origin in a right direction and a Y axis extending from the origin in a downward direction are defined.

Installation position determination screen 300 includes a zebra crossing setting portion 319 for setting a first area of the crosswalk (hereinafter, referred to as a "zebra crossing area") 304 in image 108A. Zebra crossing setting portion 319 includes a plurality of input boxes for inputting coordinate values (X, Y) of an upper end point (zebra-crossing center upper end) 311A at the center in a left-right direction of the crosswalk, a lower end point (zebra-crossing center lower end) 311B at the center in the left-right direction of the crosswalk, a point (zebra-crossing upper left end) 311C at an upper left corner of the crosswalk, a point (zebra-crossing upper right end) 311D at an upper right corner of the crosswalk, a left end point (outflow-boundary upper left end) 311E and a right end point (outflow-boundary upper right end) 311F of a boundary between a vehicle inflow lane 310A to the intersection (a lane in which the vehicle traveling direction is a direction of inflow to the intersection. Hereinafter, referred to as an "inflow lane") and a vehicle outflow lane 310B from the intersection (a lane in which the vehicle traveling direction is a direction of outflow to the intersection. Hereinafter, referred to as an "outflow lane"), a point (zebra-crossing lower left end) 311G at a lower left corner of the crosswalk, a point (zebra-crossing lower right end) 311H at a lower right corner of the crosswalk, in image 108A. The user can designate a zebra crossing area 304 in image 108A by inputting coordinate values in the respective input boxes of zebra crossing setting portion 319 or by clicking and designating the respective points in displayed image 108A. Hereinafter, zebra-crossing center upper end 311A, zebra-crossing center lower end 311B, zebra-crossing upper left end 311C, zebra-crossing upper right end 311D, outflow-boundary upper left end 311E, outflow-boundary upper right end 311F, zebra-crossing lower left end 311G, and zebra-crossing lower right end 311H are collectively referred to as an "area definition point 311". Area definition point 311 may be detected by installation support device 100 by analyzing image 108A. Zebra-crossing center upper end 311A is also referred to as an area definition point 311A, zebra-crossing center lower end 311B is also referred to as an area definition point 311B, zebra-crossing upper left end 311C is also referred to as an area definition point 311C, zebra-crossing upper right end 311D is also referred to as an area definition point 311D, outflow-boundary upper left end 311E is also referred to as an area definition point 311E, outflow-boundary upper right end 311F is also referred to as an area definition point 311F, zebra-crossing lower left end 311G is also referred to as an area definition point 311G, and zebra-crossing lower right end 311H is also referred to as an area definition point 311H.

Area determination unit 113 determines zebra crossing area 304 based on area definition points 311A to 311H. Area determination unit 113 further determines planned detection area 303 based on zebra crossing area 304. Area definition points 311A to 311H are points for defining planned detection area 303.

Planned detection area 303 is an area larger than zebra crossing area 304. Specifically, planned detection area 303 is an area obtained by expanding zebra crossing area 304 in both left and right directions and in both upward and downward directions. The portion expanded in both the left and right directions from zebra crossing area 304 is a margin for detecting a pedestrian or a bicycle (hereinafter, the term "pedestrian" includes a bicycle) walking slightly off the crosswalk. The portion extended in both the upward and downward directions from zebra crossing area 304 is a standby area for a pedestrian waiting for a walk traffic signal to wait on sidewalks 312A and 312B.

For example, non-volatile memory 102 of installation support device 100 stores a set value of the size of the margin and a set value of the size of the standby area. An example of the set value of the size of the margin is a length of the margin in a left direction from the left end of zebra crossing area 304 and a length of the margin in a right direction from the right end of zebra crossing area 304. An example of the set value of the size of the standby area is a length of the standby area in an upward direction from the upper end of zebra crossing area 304 and a length of the standby area in a downward direction from the lower end. Area determination unit 113 extends zebra crossing area 304 in both the left and right directions by a set value of the size of the margin and extends zebra crossing area 304 in both upward and downward directions by a set value of the size of the standby area to determine planned detection area 303.

Planned detection area 303 is divided into a plurality of sub-areas. In a specific example, planned detection area 303 is divided into an inflow standby area 303A, an inflow zebra crossing area 303B, an outflow zebra crossing area 303C, and an outflow standby area 303D. Inflow standby area 303A is a part of sidewalk 312A adjacent to inflow lane 310A, and is an area for a pedestrian waiting for a walk traffic signal to wait. Inflow zebra crossing area 303B is an area of the crosswalk in inflow lane 310A. Outflow zebra crossing area 303C is an area of the crosswalk in outflow lane 310B. Outflow standby area 303D is a part of sidewalk 312B adjacent to outflow lane 310B, and is an area for the pedestrian waiting for a walk traffic signal to wait. Area determination unit 113 can determine each of inflow standby area 303A, inflow zebra crossing area 303B, outflow zebra crossing area 303C, and outflow standby area 303D.

Display control unit 112 causes display device 203 to display inflow standby area 303A, inflow zebra crossing area 303B, outflow zebra crossing area 303C, and outflow standby area 303D to be superimposed on image 108A. In a specific example, display control unit 112 displays each of inflow standby area 303A, inflow zebra crossing area 303B, outflow zebra crossing area 303C, and outflow standby area 303D in a transparent color. This prevents the image of crosswalk included in image 108A from being hidden by inflow standby area 303A, inflow zebra crossing area 303B, outflow zebra crossing area 303C, and outflow standby area 303D, and the user can visually recognize not only inflow standby area 303A, inflow zebra crossing area 303B, outflow zebra crossing area 303C, and outflow standby area 303D but also the image of crosswalk. Thus, the user can easily check the positional relationship between the crosswalk and planned detection area 303 including inflow standby area 303A, inflow zebra crossing area 303B, outflow zebra crossing area 303C, and outflow standby area 303D.

Display control unit 112 can display inflow standby area 303A, inflow zebra crossing area 303B, outflow zebra crossing area 303C, and outflow standby area 303D in different colors from each other. Displaying the areas in different colors allows the user to easily distinguish inflow standby area 303A, inflow zebra crossing area 303B, outflow zebra crossing area 303C, and outflow standby area 303D from each other.

Referring to FIG. 3, target position determination unit 114 determines a target position of irradiation with a radio wave by infrastructure radio wave sensor 10 in image 108A. Referring to FIG. 5, for example, target position determination unit 114 determines a default position of target position 305 to be the center point of the upper side of inflow zebra crossing area 303B. For example, the user can designate any point in image 108A as a target position. Target position determination unit 114 can change target position 305 to a point designated by the user.

Referring to FIG. 3, candidate position designation unit 115 receives designation of a candidate position that is a candidate installation position of infrastructure radio wave sensor 10 in image 108A from the user. FIG. 5 shows an example for determining the installation position of infrastructure radio wave sensor 10 on sidewalk 312B adjacent to outflow lane 310B. The user can designate the candidate position by operating input device 201 to click a desired point in image 108A, for example.

Referring to FIG. 3, radio wave irradiation area determination unit 116 determines a radio wave irradiation area based on target position 305 determined by target position determination unit 114 and the candidate position received by candidate position designation unit 115. Installation support device 100 has information (for example, information about a beam width from a radio wave radiation plane and a reachable distance of the radio wave) for determining a radio wave irradiation area. Radio wave irradiation area determination unit 116 determines, using the above-described information, a radio wave irradiation area that is an area having a width equal to the beam width with a straight line connecting the candidate position and target position 305 as a center line of the width and is an area extending to the reachable distance of a radio wave from the candidate position.

Figure 6:
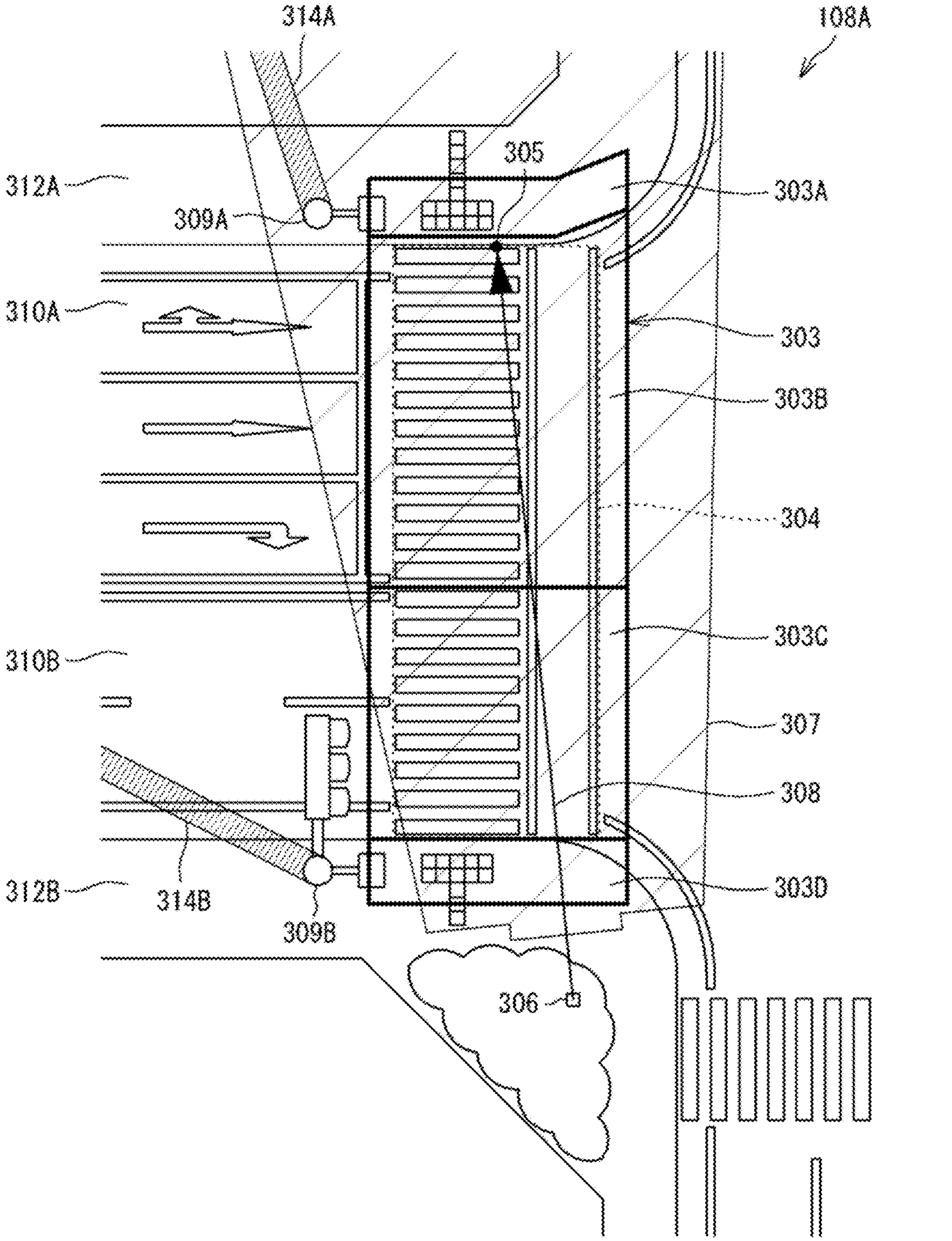
FIG. 6 is a diagram showing an example of an image including a crosswalk on which a radio wave irradiation area is superimposed.

Display control unit 112 causes display device 203 to display the radio wave irradiation area determined by radio wave irradiation area determination unit 116 to be superimposed on image 108A. FIG. 6 is a diagram showing an example of an image including a crosswalk on which a radio wave irradiation area is superimposed. For example, as shown in FIG. 6, a radio wave irradiation area 307 is displayed in a transparent color. This prevents the image of the crosswalk included in image 108A and planned detection area 303 from being hidden by radio wave irradiation area 307, and the user can visually recognize radio wave irradiation area 307, the image of the crosswalk, and planned detection area 303. Thus, the user can easily check the positional relationship between radio wave irradiation area 307, the crosswalk, and planned detection area 303 including inflow standby area 303A, inflow zebra crossing area 303B, outflow zebra crossing area 303C, and outflow standby area 303D. For example, the user can easily check whether radio wave irradiation area 307 overlaps entire planned detection area 303. When a part of planned detection area 303 is deviated from radio wave irradiation area 307, the user can easily check which part of planned detection area 303 is deviated and how much the size of the deviated part is deviated.

Display control unit 112 can make the display color of radio wave irradiation area 307 different from the display colors of inflow standby area 303A, inflow zebra crossing area 303B, outflow zebra crossing area 303C, and outflow standby area 303D. This allows the user to easily distinguish radio wave irradiation area 307 from each of inflow standby area 303A, inflow zebra crossing area 303B, outflow zebra crossing area 303C, and outflow standby area 303D.

Display control unit 112 causes display device 203 to display a straight line or line segment connecting target position 305 and a candidate position 306. For example, the straight line or line segment is an arrow 308 pointing from candidate position 306 to target position 305. Display control unit 112 causes display device 203 to display arrow 308 on image 108A, planned detection area 303, and radio wave irradiation area 307 to be superimposed. Thus, the user can easily check the direction of irradiation with a radio wave.

Referring to FIG. 3, obstacle setting unit 117 sets an obstacle that blocks radio waves in association with image 108A. Reference is made to FIG. 4A and FIG. 4B. Traffic signal poles 309A and 309B are examples of obstacles that block radio waves. The user inputs the coordinates of the obstacles in image 108A to installation support device 100. In the example of FIG. 4A and FIG. 4B, installation position determination screen 300 includes an obstacle setting portion 313 for setting the positions of the obstacles in image 108A. Obstacle setting portion 313 includes a plurality of input boxes for inputting coordinate values of definition points of traffic signal poles 309A and 309B which are obstacles in image 108A. The user can set the obstacles in image 108A by inputting coordinate values to the respective input boxes of obstacle setting portion 313 or by clicking and designating definition points of the obstacles in displayed image 108A.

Referring to FIG. 3, non-irradiation area determination unit 118 determines a non-irradiation area in which a radio wave radiated by infrastructure radio wave sensor 10 is blocked by each of the obstacles (traffic signal poles 309A and 309B). Display control unit 112 causes display device 203 to display the non-irradiation area determined by non-irradiation area determination unit 118 on image 108A to be superimposed. Reference is made to FIG. 6. Each of the non-irradiation areas is formed in an area in a direction opposite to a direction from each of the obstacles to candidate position 306. A non-irradiation area 314A is formed in an area in a direction opposite to a direction from traffic signal pole 309A to candidate position 306. A non-irradiation area 314B is formed in an area in a direction opposite to a direction from traffic signal pole 309B to candidate position 306. Non-irradiation area 314A is an area extending in a direction opposite to the direction from traffic signal pole 309A to candidate position 306, and has a width depending on the size of traffic signal pole 309A. Non-irradiation area 314B is an area extending in a direction opposite to the direction from traffic signal pole 309B to candidate position 306, and has a width depending on the size of traffic signal pole 309B.

Display control unit 112 can make the display colors of non-irradiation area 314A and non-irradiation area 314B different from the display colors of inflow standby area 303A, inflow zebra crossing area 303B, outflow zebra crossing area 303C, outflow standby area 303D, and radio wave irradiation area 307. This allows the user to easily distinguish non-irradiation area 314A and non-irradiation area 314B from each of inflow standby area 303A, inflow zebra crossing area 303B, outflow zebra crossing area 303C, outflow standby area 303D, and radio wave irradiation area 307.

Referring to FIG. 3, evaluation unit 119 evaluates candidate position 306 designated by the user based on radio wave irradiation area 307 and planned detection area 303 in image 108A. In a specific example, evaluation unit 119 calculates a coverage rate (hereinafter, referred to as an "overall coverage rate") which is a ratio of a portion where planned detection area 303 and radio wave irradiation area 307 overlap each other to planned detection area 303. Evaluation unit 119 evaluates candidate position 306 based on the overall coverage rate.

Evaluation unit 119 can determine a rank of candidate position 306 based on a comparison between the overall coverage rate and a threshold. In a more specific example, evaluation unit 119 calculates the overall coverage rate for inflow standby area 303A, inflow zebra crossing area 303B, outflow zebra crossing area 303C, and outflow standby area 303D, included in planned detection area 303. Evaluation unit 119 determines the rank of candidate position 306 based on the overall coverage rates for inflow standby area 303A, inflow zebra crossing area 303B, outflow zebra crossing area 303C, and outflow standby area 303D.

Hereinafter, inflow standby area 303A, inflow zebra crossing area 303B, outflow zebra crossing area 303C, and outflow standby area 303D are also collectively referred to as a "sub-area". Evaluation unit 119 uses, for example, a first threshold for a sub-area. Evaluation unit 119 calculates, for each sub-area, a coverage rate (hereinafter referred to as a "partial coverage rate") that is a ratio of a portion where the sub-area and radio wave irradiation area 307 overlap each other to the sub-area. Evaluation unit 119 compares each partial coverage rate with the first threshold and determines whether or not the partial coverage rate is equal to or greater than the first threshold. Evaluation unit 119 can determine the rank of candidate position 306 based on whether or not there is a sub-area having a partial coverage rate less than the first threshold.

Evaluation unit 119 can further use a second threshold for a planned detection area. For example, evaluation unit 119 calculates an overall coverage rate that is a ratio of a portion where the planned detection area and radio wave irradiation area 307 overlap each other to the planned detection area. Evaluation unit 119 compares the overall coverage rate with the second threshold and determines whether or not the overall coverage rate is equal to or greater than the second threshold. Evaluation unit 119 can determine the rank of candidate position 306 based on whether or not the overall coverage rate is less than the second threshold.

Evaluation unit 119 can further evaluate candidate position 306 based on non-irradiation area 314A and non-irradiation area 314B. For example, evaluation unit 119 can exclude portions where the sub-area overlaps non-irradiation area 314A and non-irradiation area 314B from a portion where the sub-area and radio wave irradiation area 307 overlap each other in the calculation of the partial coverage rate. More specifically, when non-irradiation area 314A and non-irradiation area 314B overlap radio wave irradiation area 307, evaluation unit 119 can exclude the portions where the sub-area overlaps non-irradiation areas 314A and 314B from the portion where the sub-area and radio wave irradiation area 307 overlap each other. For example, evaluation unit 119 can exclude portions where planned detection area 303 overlaps non-irradiation area 314A and non-irradiation area 314B from a portion where planned detection area 303 and radio wave irradiation area 307 overlap each other in the calculation of the overall coverage rate. More specifically, when non-irradiation area 314A and non-irradiation area 314B overlap radio wave irradiation area 307, evaluation unit 119 can exclude the portions where planned detection area 303 overlaps non-irradiation area 314A and non-irradiation area 314B from the portion where planned detection area 303 and radio wave irradiation area 307 overlap each other.

Evaluation unit 119 can determine the rank of candidate position 306 based on a positional relationship between candidate position 306 and planned detection area 303. For example, a recommended area, a semi-recommended area, and a non-recommended area are defined based on planned detection area 303 and zebra crossing area 304. Evaluation unit 119 can determine the rank of candidate position 306 based on whether candidate position 306 is present in a recommended area, a semi-recommended area, or a non-recommended area.

FIG. 7A to FIG. 7E are diagrams for explaining examples of the rank. In the examples of FIG. 7A to FIG. 7E, evaluation unit 119 assigns candidate position 306 to one of five ranks from A to E.

It is estimated that the smaller the angle between a direction of irradiation with a radio wave by infrastructure radio wave sensor 10 and a traveling direction of a pedestrian on the crosswalk, the better the detection accuracy can be obtained. For this reason, in a sidewalk (sidewalk 312B adjacent to outflow lane 310B in the example of FIG. 5) where infrastructure radio wave sensor 10 is installed, an area obtained by extending zebra crossing area 304 in a longitudinal direction is set as a recommended area 315A in which installation of infrastructure radio wave sensor 10 is recommended. In the sidewalk where infrastructure radio wave sensor 10 is installed, an area obtained by extending areas on the left and right sides of zebra crossing area 304 with respect to the pedestrian traveling direction (margin areas extended in the left and right directions from zebra crossing area 304) inside planned detection area 303 in the pedestrian traveling direction is set as a semi-recommended area 315B. Semi-recommended area 315B is an area in which the installation of infrastructure radio wave sensor 10 is recommended after recommended area 315A. An area other than recommended area 315A and semi-recommended area 315B is set as a non-recommended area 315C. Non-recommended area 315C is an area in which the installation of infrastructure radio wave sensor 10 is not recommended.

Figure 7A:
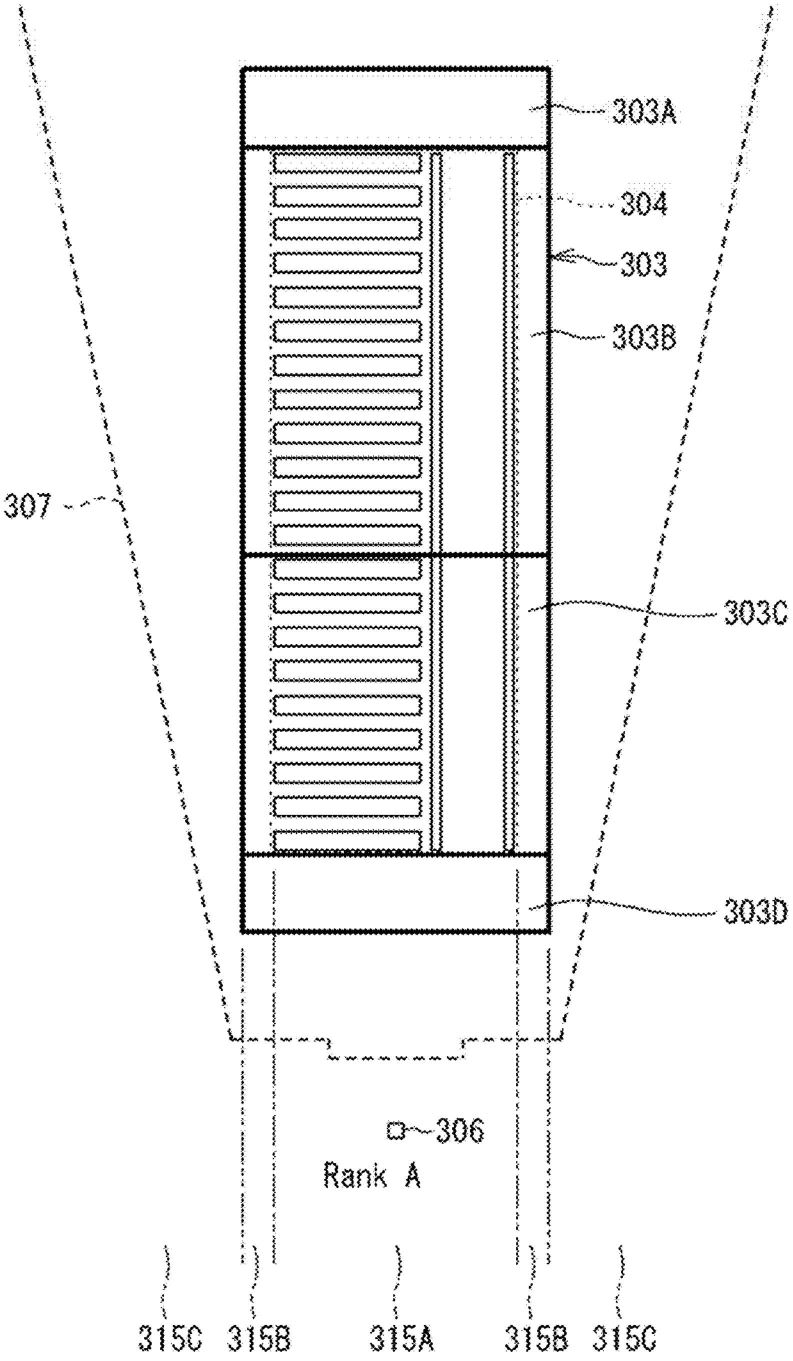
FIG. 7A is a diagram for explaining an example of rank A.

For example, in a case where the partial coverage rates for all sub-areas are equal to or greater than the first threshold, when candidate position 306 is within recommended area 315A, candidate position 306 is determined as a rank A which is the highest rank (FIG. 7A).

Figure 7B:
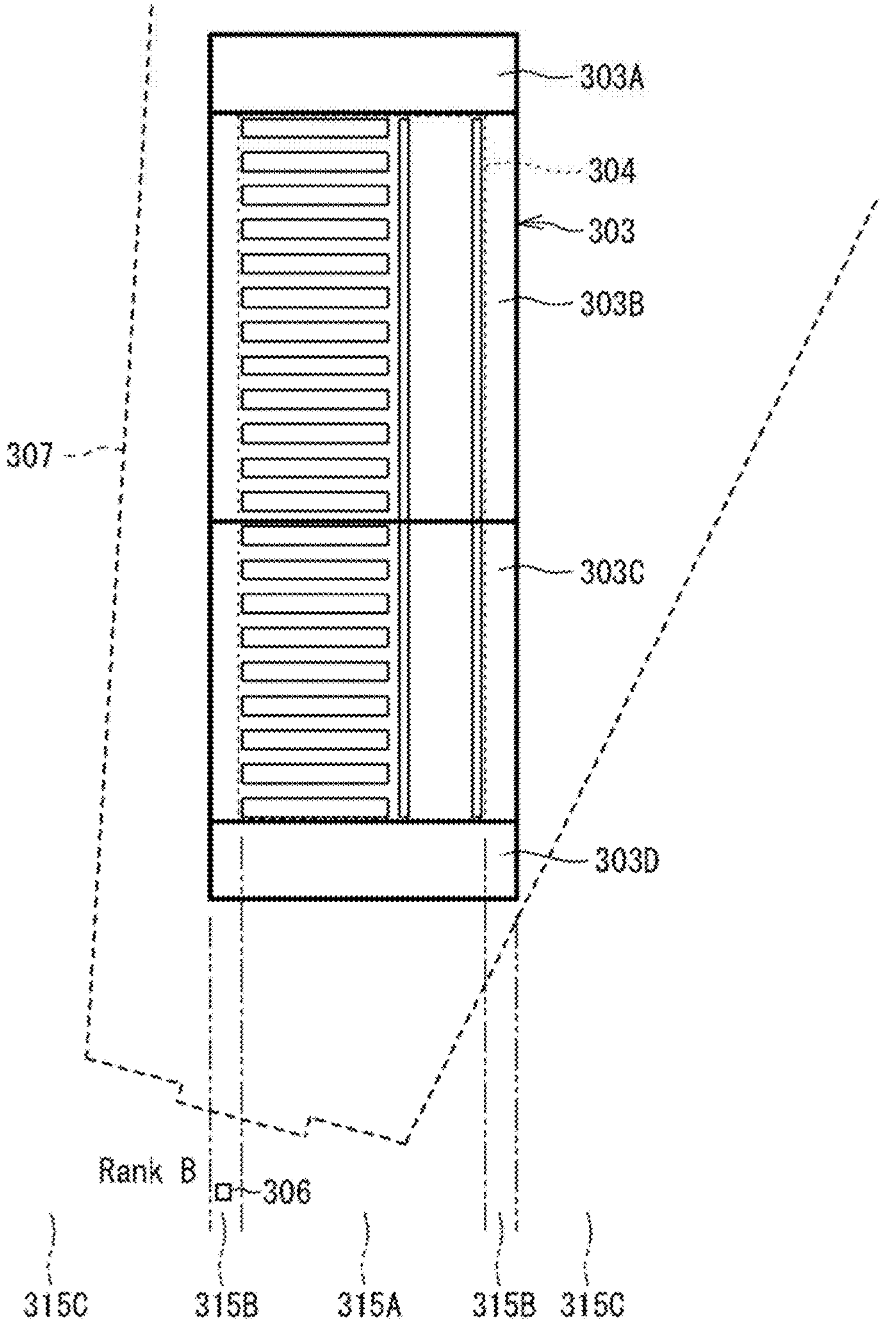
FIG. 7B is a diagram for explaining an example of rank B.

For example, in a case in which the partial coverage rates for all sub-areas are equal to or greater than the first threshold, when candidate position 306 is within semi-recommended area 315B, candidate position 306 is determined as a rank B which is the second rank (FIG. 7B).

Figure 7C:
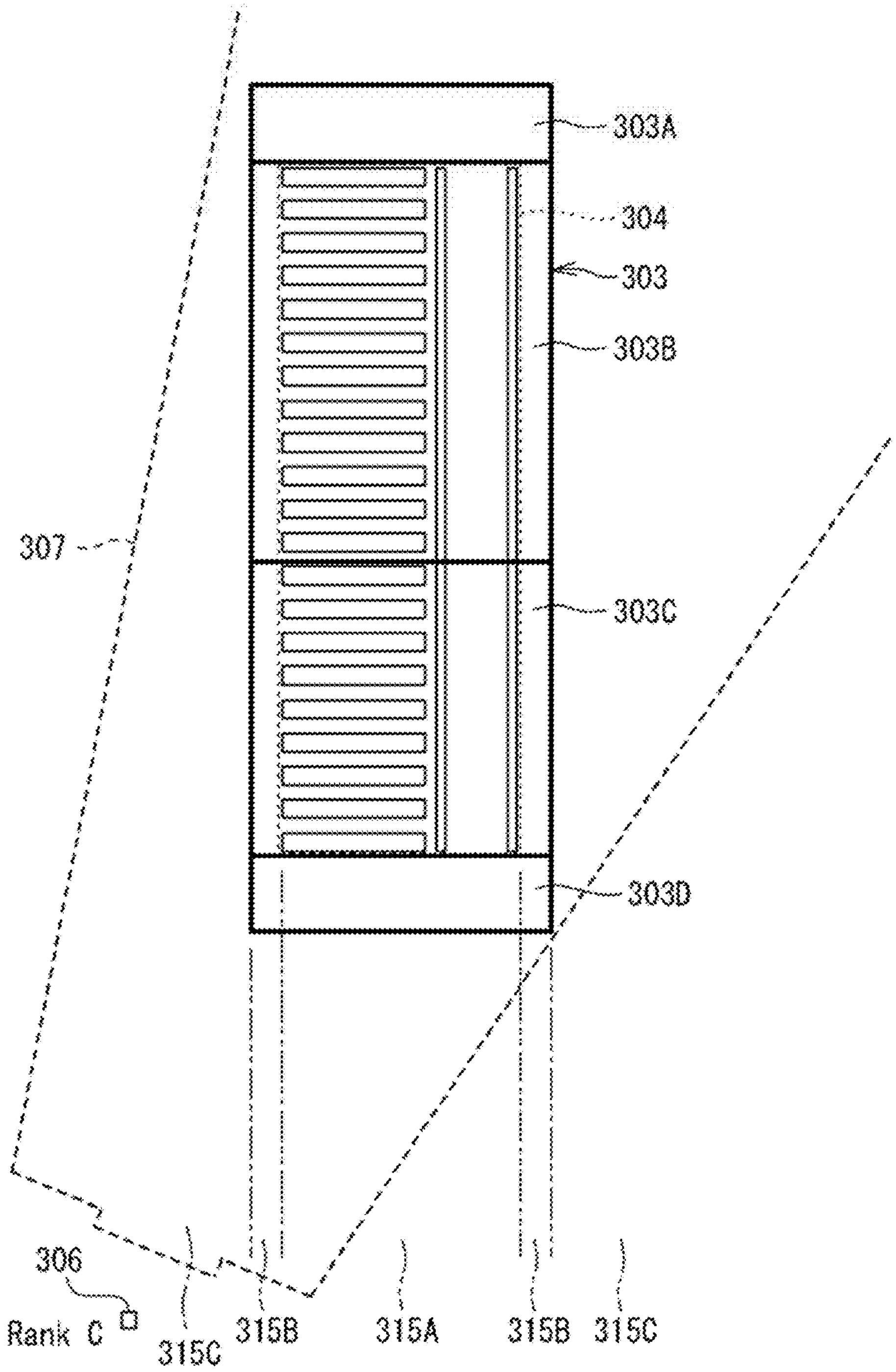
FIG. 7C is a diagram for explaining an example of rank C.

For example, in a case in which the partial coverage rates for all sub-areas are equal to or greater than the first threshold, when candidate position 306 is within non-recommended area 315C, candidate position 306 is determined as a rank C which is the third rank (FIG. 7C).

Figure 7D:
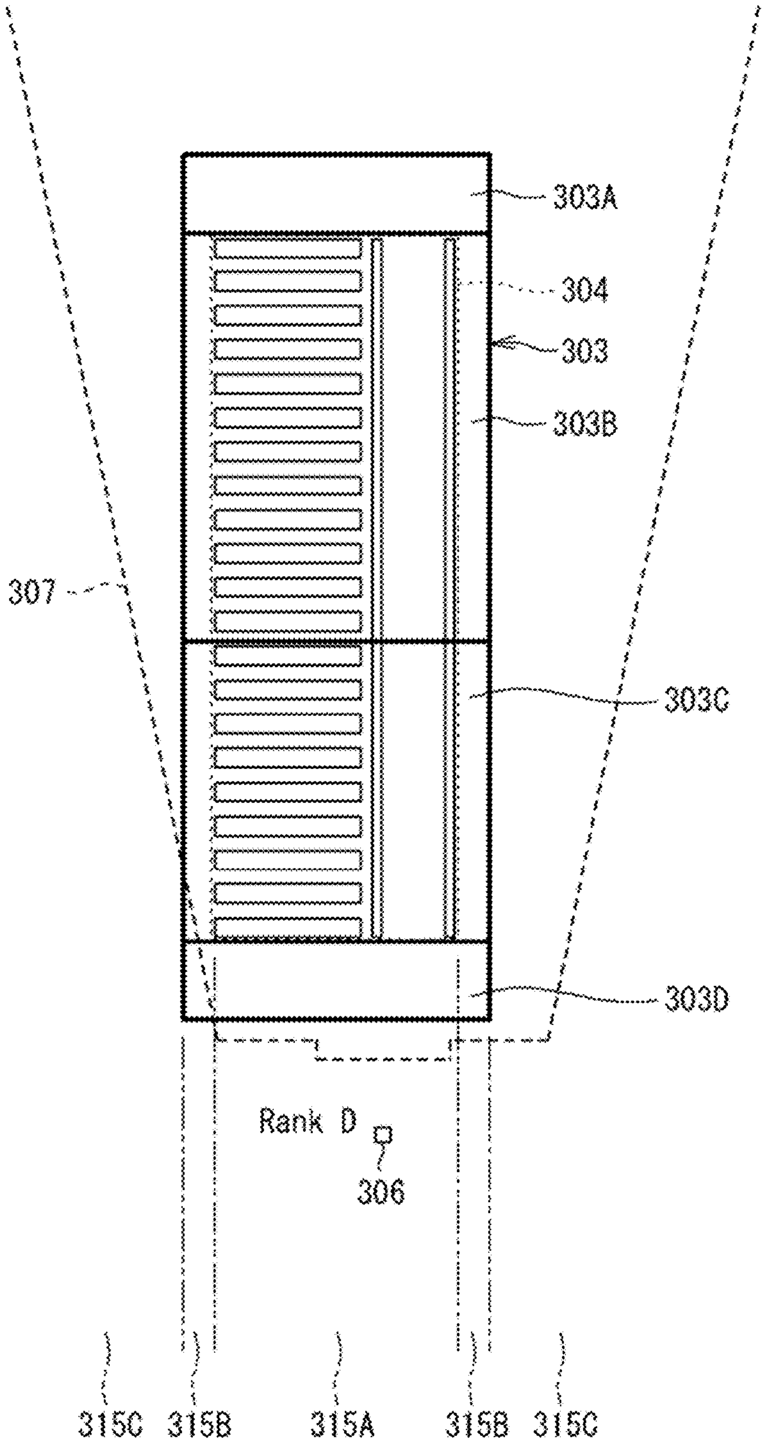
FIG. 7D is a diagram for explaining an example of rank D.

For example, when the partial coverage rate for at least one sub-area is less than the first threshold and the overall coverage rate is equal to or greater than the second threshold, candidate position 306 is determined as a rank D which is the fourth rank (FIG. 7D).

Figure 7E:
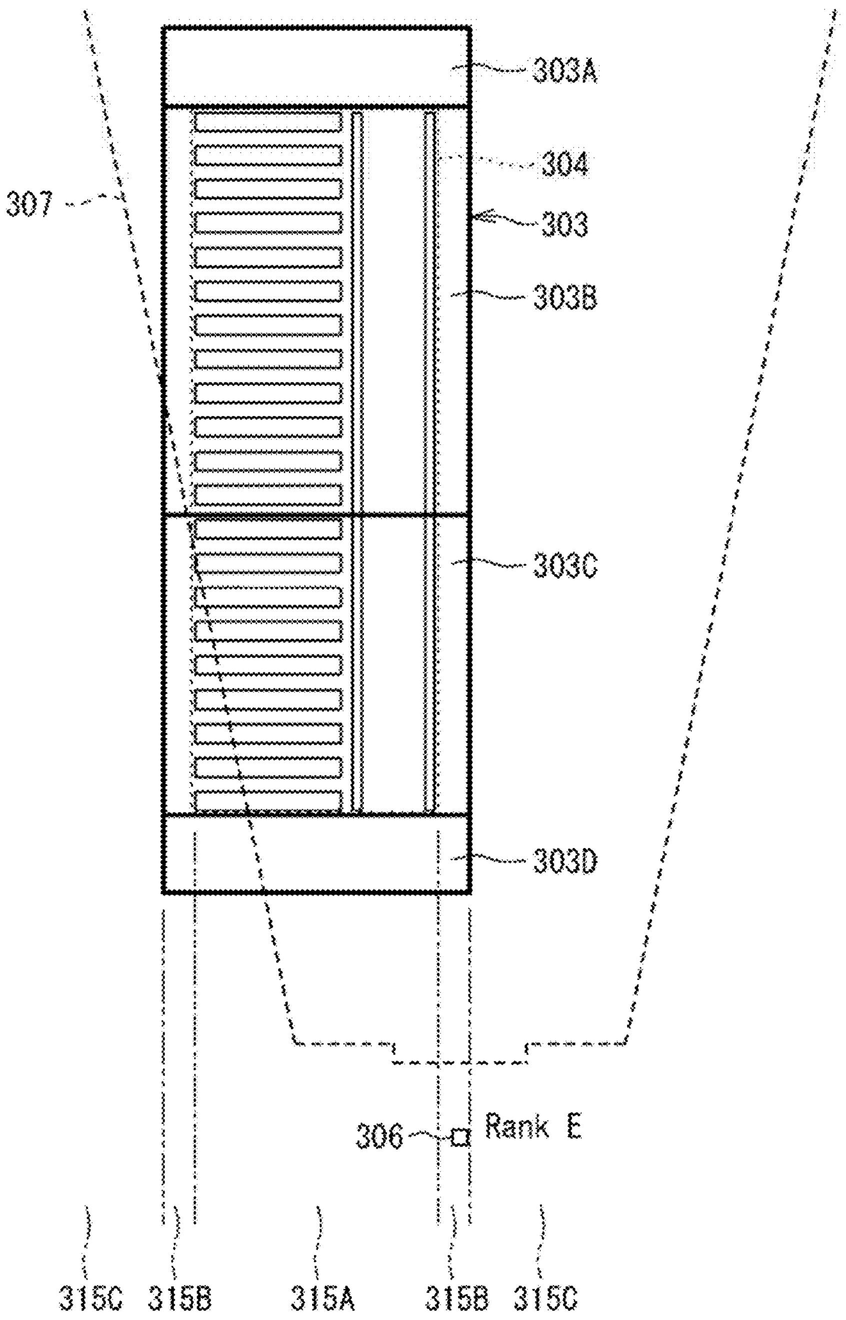
FIG. 7E is a diagram for explaining an example of rank E.

For example, when the partial coverage rate for at least one sub-area is less than the first threshold and the overall coverage rate is less than the second threshold, candidate position 306 is determined as a rank E which is the lowest rank (FIG. 7E).

Referring to FIG. 3, display control unit 112 causes display device 203 to display, at the candidate position in image 108A, a mark indicating the result of the evaluation of candidate position 306 as the installation position of infrastructure radio wave sensor 10. For example, a different mark is displayed for each rank at candidate position 306. In a specific example, the color of the mark is different for each rank. For example, the color of the mark for rank A is blue, the color of the mark for rank B is green, the color of the mark for rank C is yellow, the color of the mark for rank D is orange, and the color of the mark for rank E is red. The shape of the mark may be different for each rank.

Figure 8A:
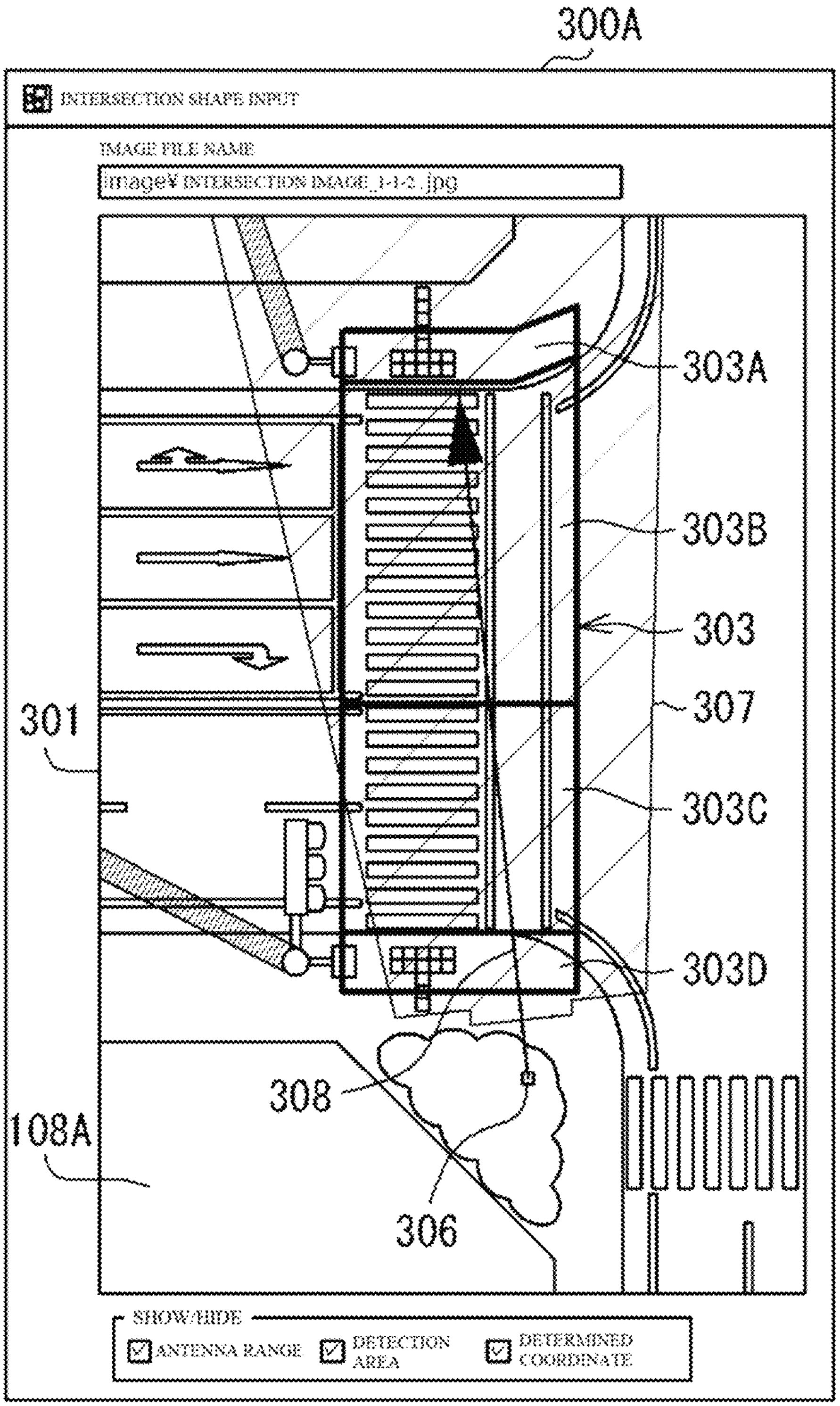
FIG. 8A is a diagram showing a left portion of an example of an installation position determination screen on which an evaluation result of one candidate position is displayed.
Figure 8B:
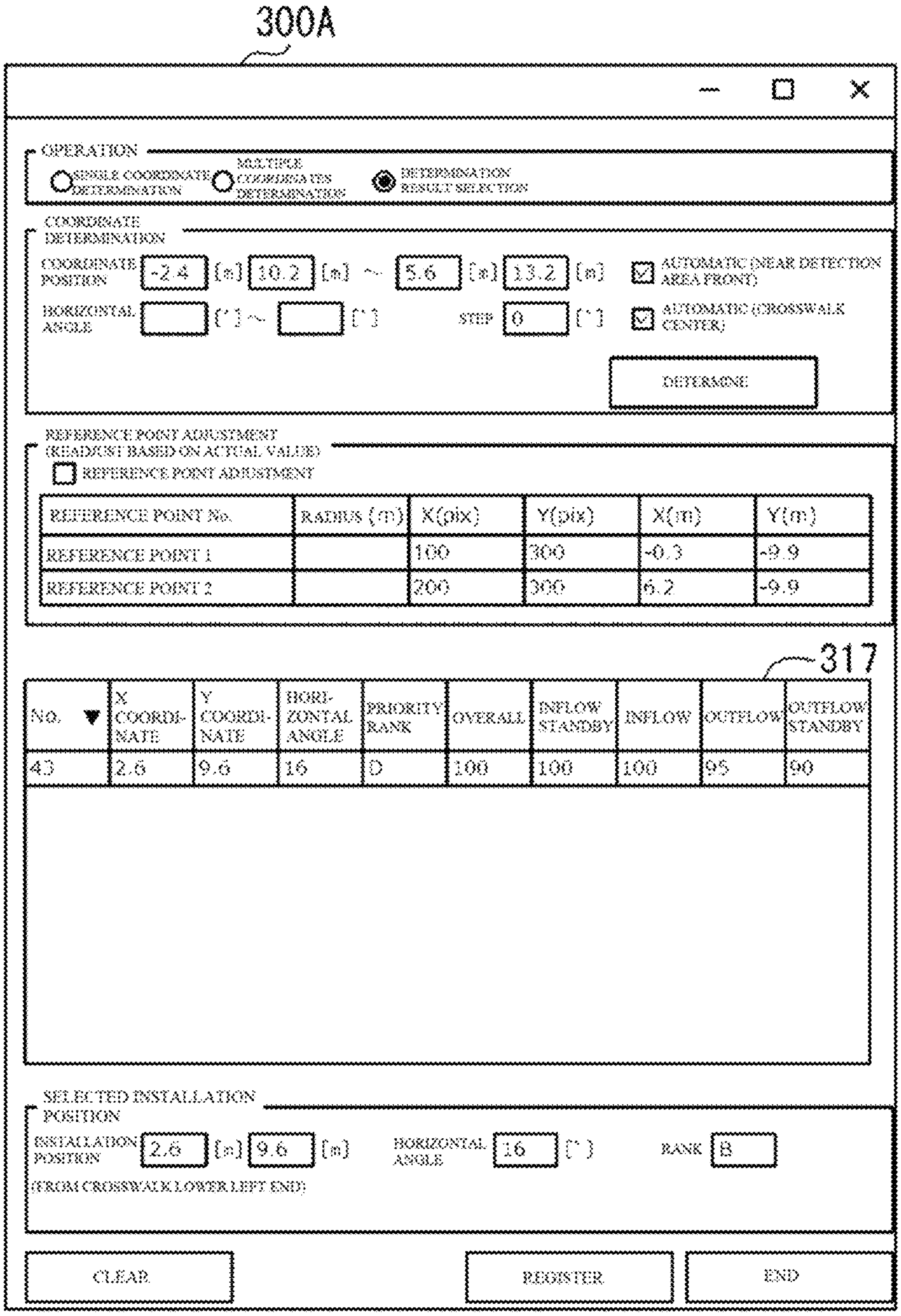
FIG. 8B is a diagram showing a right portion of an example of the installation position determination screen on which the evaluation result of one candidate position is displayed.

Display control unit 112 causes display device 203 to display the evaluation result of candidate position 306 on the installation position determination screen. FIG. 8A and FIG. 8B are diagrams showing an example of an installation position determination screen on which an evaluation result of one candidate position is displayed. When the evaluation result of the candidate position is obtained by evaluation unit 119, installation position determination screen 300 transitions to an installation position determination screen 300A including an evaluation result display portion 317. Evaluation result display portion 317 includes each value of the coordinates (X coordinate, Y coordinate) of the candidate position, the horizontal angle (the angle between the direction of irradiation with a radio wave and the pedestrian traveling direction in zebra crossing area 304), the rank ("priority rank" in FIG. 8B), the overall coverage rate ("overall" in FIG. 8B), the partial coverage rate for inflow standby area 303A ("inflow standby" in FIG. 8B), the partial coverage rate for inflow zebra crossing area 303B ("inflow" in FIG. 8B), the partial coverage rate for outflow zebra crossing area 303C ("outflow standby" in FIG. 8B), and the partial coverage rate in outflow standby area 303D ("outflow standby" in FIG. 8B).

Referring to FIG. 3, candidate position designation unit 115 receives a continuous change in the coordinates of candidate position 306 designated by the user in input device 201 as an instruction to move candidate position 306. Display control unit 112 changes the shape of radio wave irradiation area 307 while fixing target position 305 in response to the movement of candidate position 306 instructed by the user. More specifically, display control unit 112 changes the shape of radio wave irradiation area 307 by real-time processing in response to a continuous change in the designated coordinates.

Display control unit 112 changes the shapes of non-irradiation area 314A and non-irradiation area 314B in response to the movement of candidate position 306 instructed by the user. More specifically, display control unit 112 changes the shapes of non-irradiation area 314A and non-irradiation area 314B by real-time processing in response to the continuous change in the designated coordinates.

Figure 9:
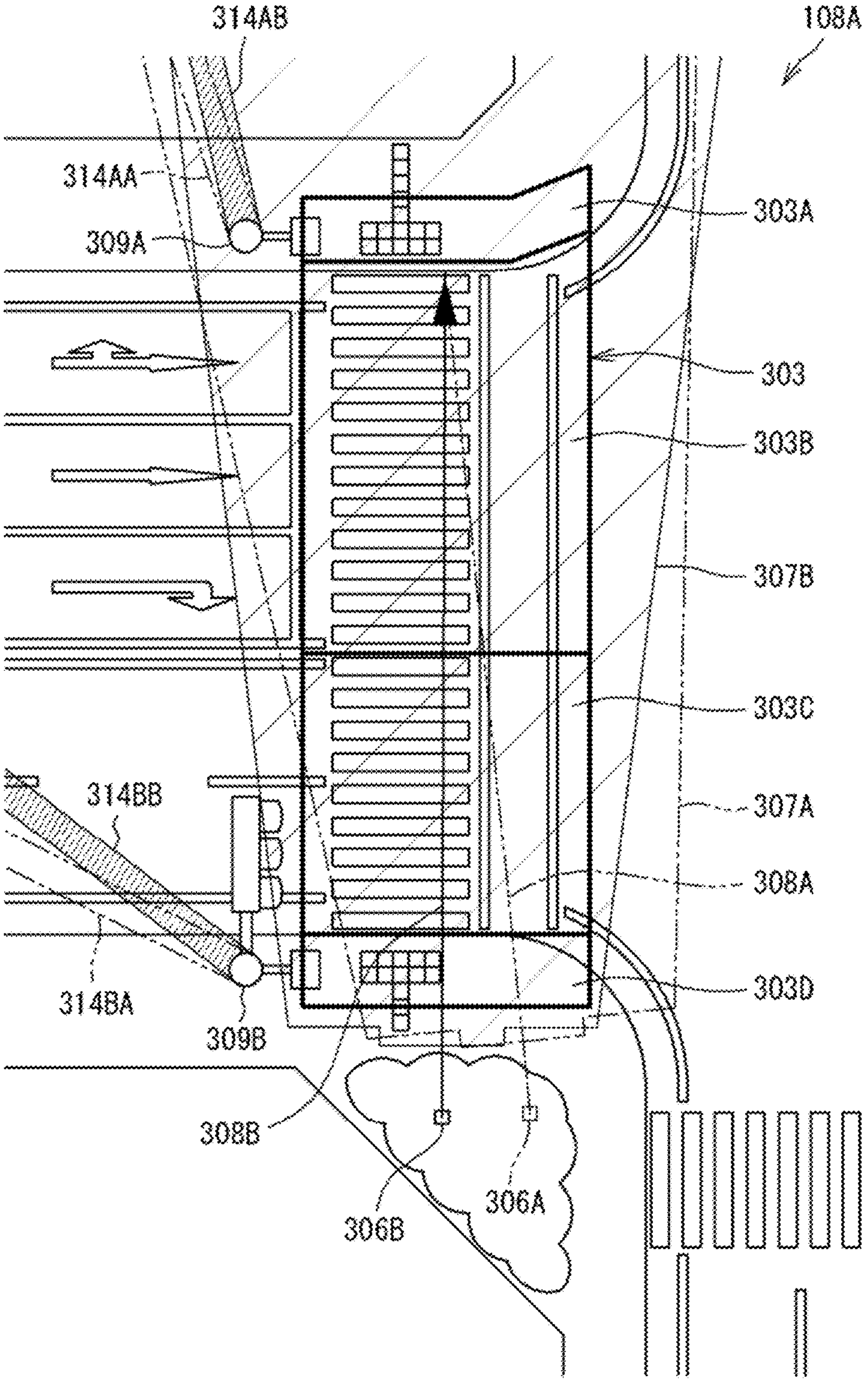
FIG. 9 is a diagram showing an example of a transition of a radio wave irradiation area in response to a continuous change in coordinates of a candidate position.

FIG. 9 is a diagram showing an example of a transition of a radio wave irradiation area in response to the continuous change in the coordinates of the candidate position. The user can operate input device 201 to continuously change the coordinates of candidate position 306 by, for example, drag-and-drop. Candidate position designation unit 115 receives such a movement instruction of candidate position 306 from the user. Radio wave irradiation area determination unit 116 determines radio wave irradiation area 307 while fixing target position 305 for each candidate position 306 that changes. Display control unit 112 displays radio wave irradiation area 307 determined by radio wave irradiation area determination unit 116 by real-time processing.

In response to movement from a candidate position 306A to a candidate position 306B, the radio wave irradiation area transitions from a radio wave irradiation area 307A to a radio wave irradiation area 307B. Furthermore, arrow 308 connecting candidate position 306 and target position 305 changes in real time in response to the change in the coordinates of candidate position 306. That is, the arrow transitions from an arrow 308A to an arrow 308B in response to the transition from candidate position 306A to candidate position 306B. As described above, since radio wave irradiation area 307 is changed by the real-time processing, the user can check the overlap between planned detection area 303 and radio wave irradiation area 307 while moving candidate position 306. As a result, the user can easily find a candidate position allowing radio wave irradiation area 307 to have a large area overlapping planned detection area 303.

Non-irradiation area determination unit 118 determines non-irradiation area 314A and non-irradiation area 314B for each of candidate positions 306 that change. Display control unit 112 displays non-irradiation area 314A and non-irradiation area 314B determined by non-irradiation area determination unit 118 by real-time processing.

In response to the movement from candidate position 306A to candidate position 306B, the non-irradiation area transitions from a non-irradiation area 314AA to a non-irradiation area 314AB and from a non-irradiation area 314BA to a non-irradiation area 314BB. Non-irradiation area 314AA and non-irradiation area 314AB are areas where radio waves are blocked by traffic signal pole 309A, and non-irradiation area 314BA and non-irradiation area 314BB are areas where radio waves are blocked by traffic signal pole 309B.

Referring to FIG. 3, candidate position designation unit 115 can receive designation of a second area including a plurality of candidate positions 306 in image 108A from the user. Radio wave irradiation area determination unit 116 determines radio wave irradiation area 307 for each of candidate positions 306 included in the designated area. Non-irradiation area determination unit 118 determines non-irradiation area 314A and non-irradiation area 314B for each of candidate positions 306 included in the designated area.

Evaluation unit 119 evaluates each of candidate positions 306 included in the designated area based on radio wave irradiation area 307, non-irradiation area 314A and non-irradiation area 314B, and planned detection area 303. In a specific example, evaluation unit 119 determines the rank of each of candidate positions 306 included in the designated area. Display control unit 112 causes display device 203 to display a plurality of marks corresponding to each of the plurality of candidate positions 306 in an area designated by the user in image 108A.

Figure 10:
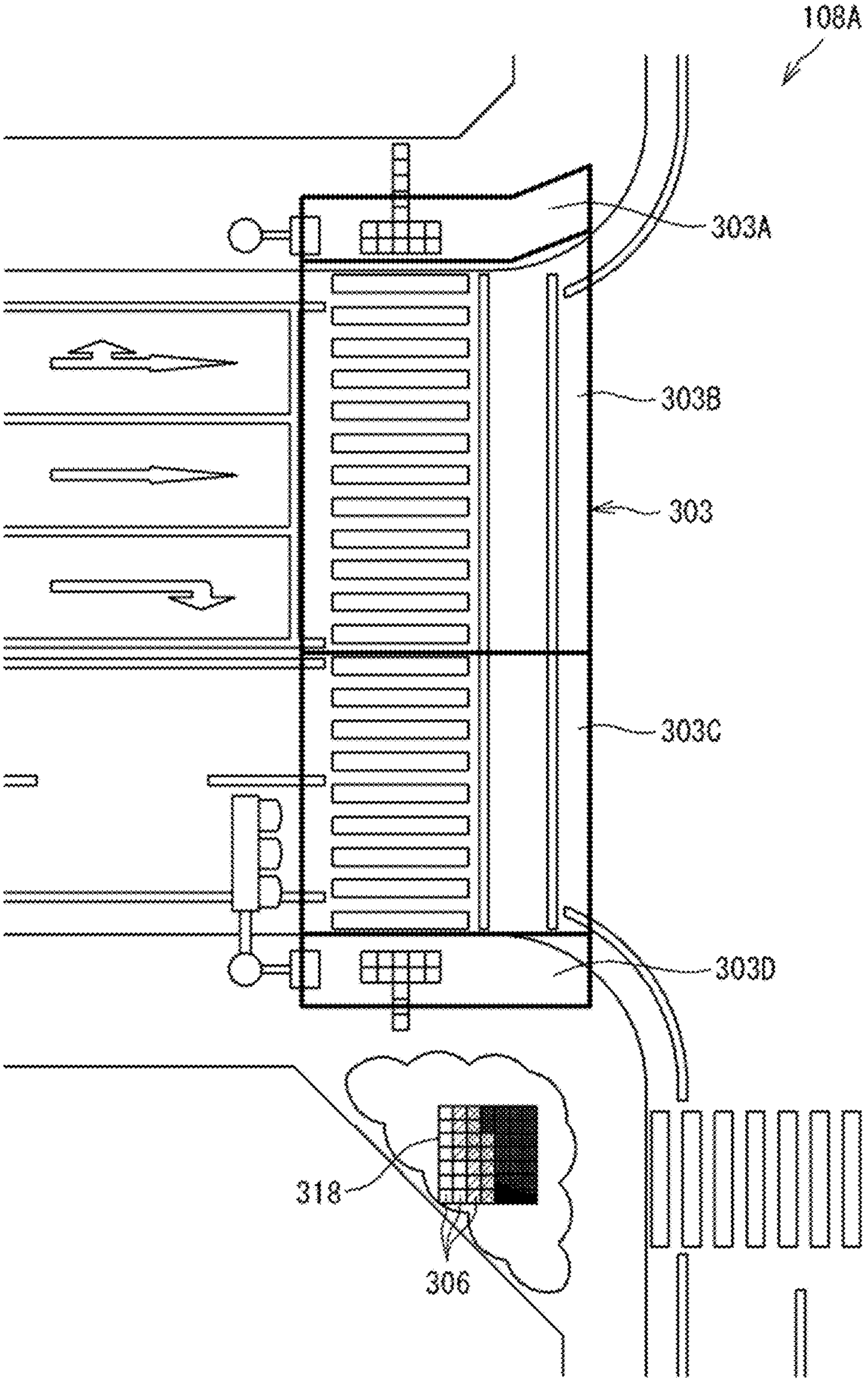
FIG. 10 is a diagram showing an example of an installation position determination screen when a second area including a plurality of candidate positions is designated.

FIG. 10 is a diagram showing an example of an installation position determination screen when a second area including a plurality of candidate positions is designated. The user can operates input device 201 to designate a second area (hereinafter referred to as a "candidate area") 318 including the plurality of candidate positions 306 by, for example, drag-and-drop. Candidate area 318 is, for example, a rectangular area. Candidate area 318 is a set of a plurality of unit areas, and each of unit areas is candidate position 306. The unit area is, for example, a rectangular area.

The evaluation result of each of candidate positions 306 included in candidate area 318 is displayed in candidate area 318. In other words, marks indicating the ranks of candidate positions 306 are displayed side by side in candidate area 318. Therefore, the user can check the marks included in candidate area 318 to collectively check the rank of each of candidate positions 306 included in candidate area 318.

When candidate area 318 is designated, radio wave irradiation area 307, non-irradiation area 314A, and non-irradiation area 314B corresponding to respective candidate positions 306 are determined. When candidate area 318 is designated, radio wave irradiation area 307, non-irradiation area 314A, and non-irradiation area 314B are not displayed on image 108A. This makes it possible to avoid the complication caused by the display of pluralities of radio wave irradiation areas 307, non-irradiation areas 314A, and non-irradiation areas 314B.

Figure 11A:
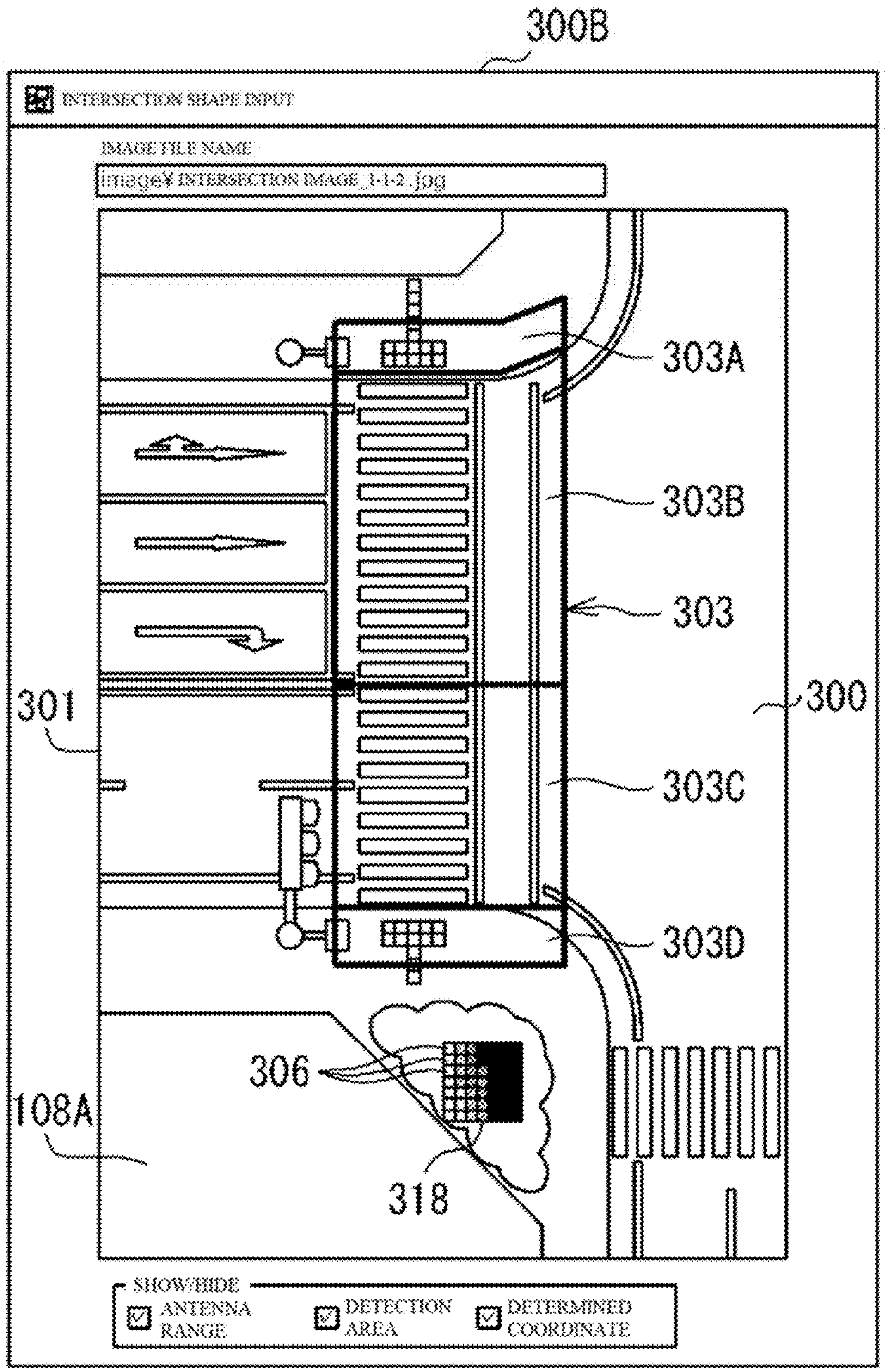
FIG. 11A is a diagram showing a left portion of an example of an installation position determination screen on which evaluation results of a plurality of candidate positions are displayed.
Figure 11B:
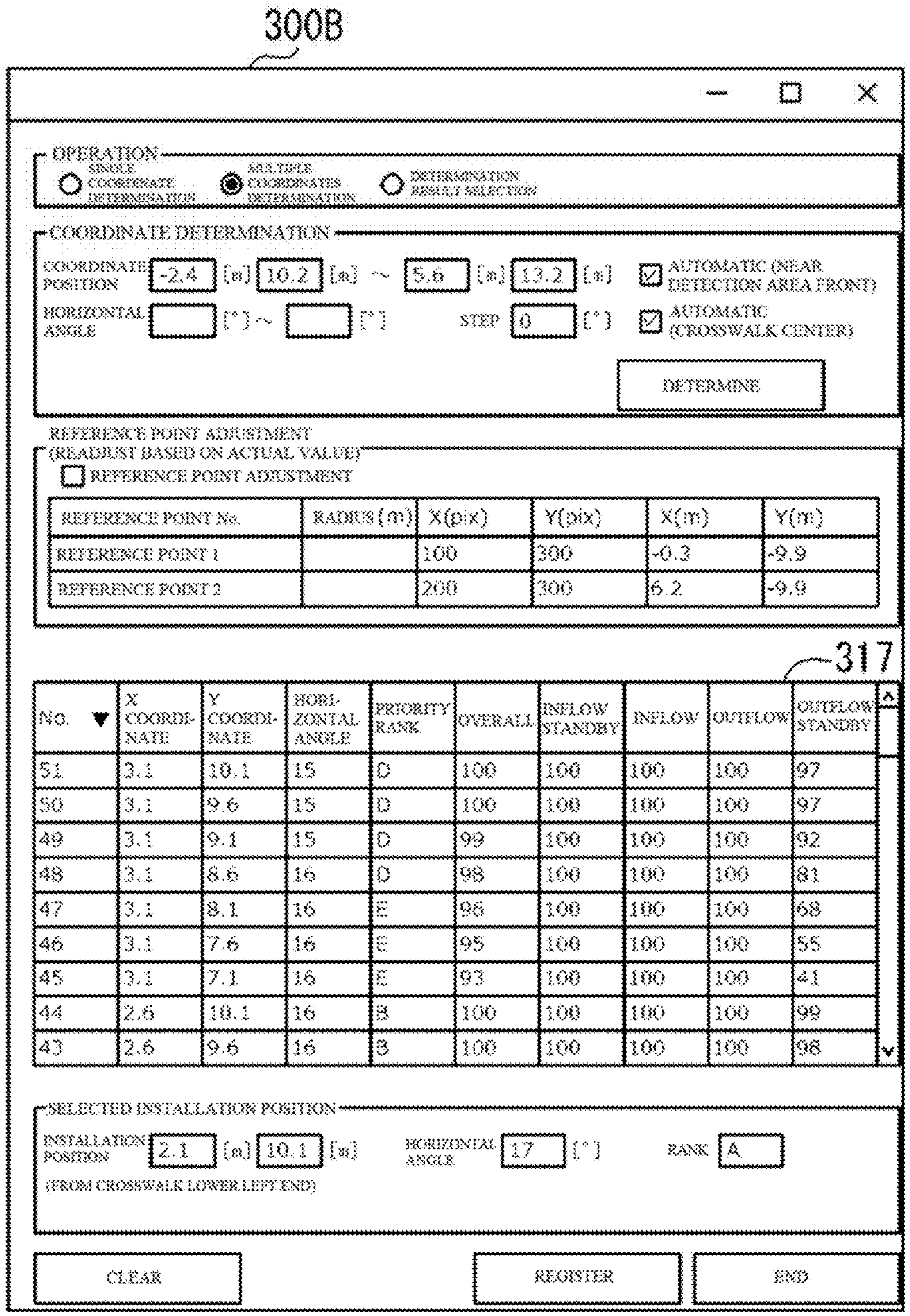
FIG. 11B is a diagram showing a right portion of an example of the installation position determination screen on which the evaluation results of the plurality of candidate positions are displayed.

Display control unit 112 causes display device 203 to display the evaluation results of the plurality of candidate positions 306 on the installation position determination screen. FIG. 11A and FIG. 11B are diagrams showing an example of the installation position determination screen on which the evaluation results of the plurality of candidate positions are displayed. When the evaluation results of respective candidate positions 306 included in candidate area 318 are obtained, an installation position determination screen 300B including evaluation result display portion 317 indicating the evaluation results of the plurality of candidate positions 306 is displayed. Evaluation result display portion 317 displays a list of the evaluation results of the plurality of candidate positions 306 included in candidate area 318. The display items in evaluation result display portion 317 are the same as the display items in evaluation result display portion 317 shown in FIG. 8B.

The user can determine one of candidate positions 306 as the installation position of infrastructure radio wave sensor 10 in consideration of the above-described evaluation results of candidate positions 306. Referring to FIG. 3, form creation unit 120 creates a form for installing infrastructure radio wave sensor 10 at the determined one of candidate positions 306 based on target position 305 determined by target position determination unit 114 and the one of candidate positions 306 received by candidate position designation unit 115. Output unit 121 outputs the form created by form creation unit 120. In a specific example, output unit 121 outputs data for printing the form to printer 202, and printer 202 prints the form. Output unit 121 may cause display device 203 to display the form.

Figure 12A:
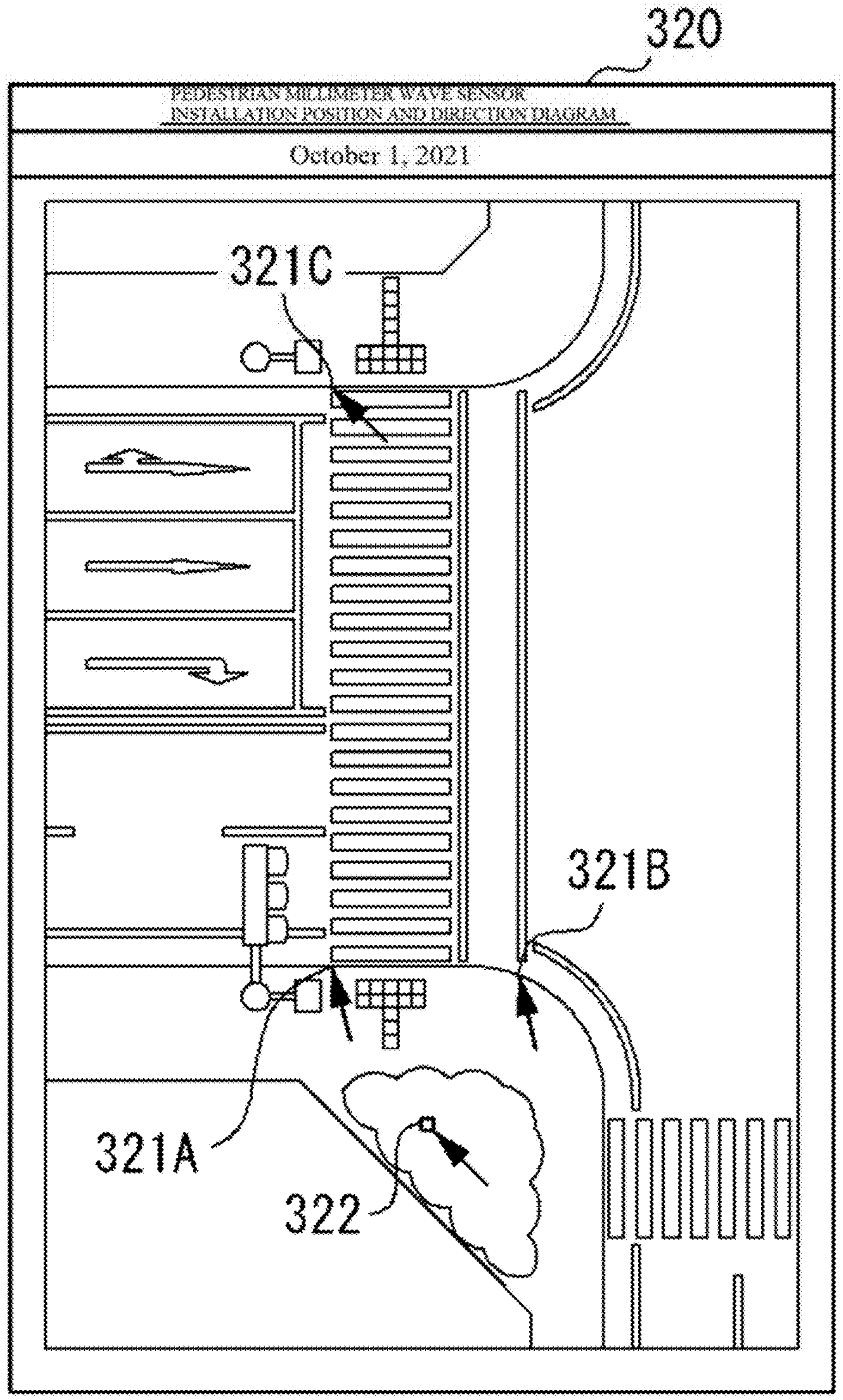
FIG. 12A is a diagram showing a left portion of an example of a form.
Figure 12B:
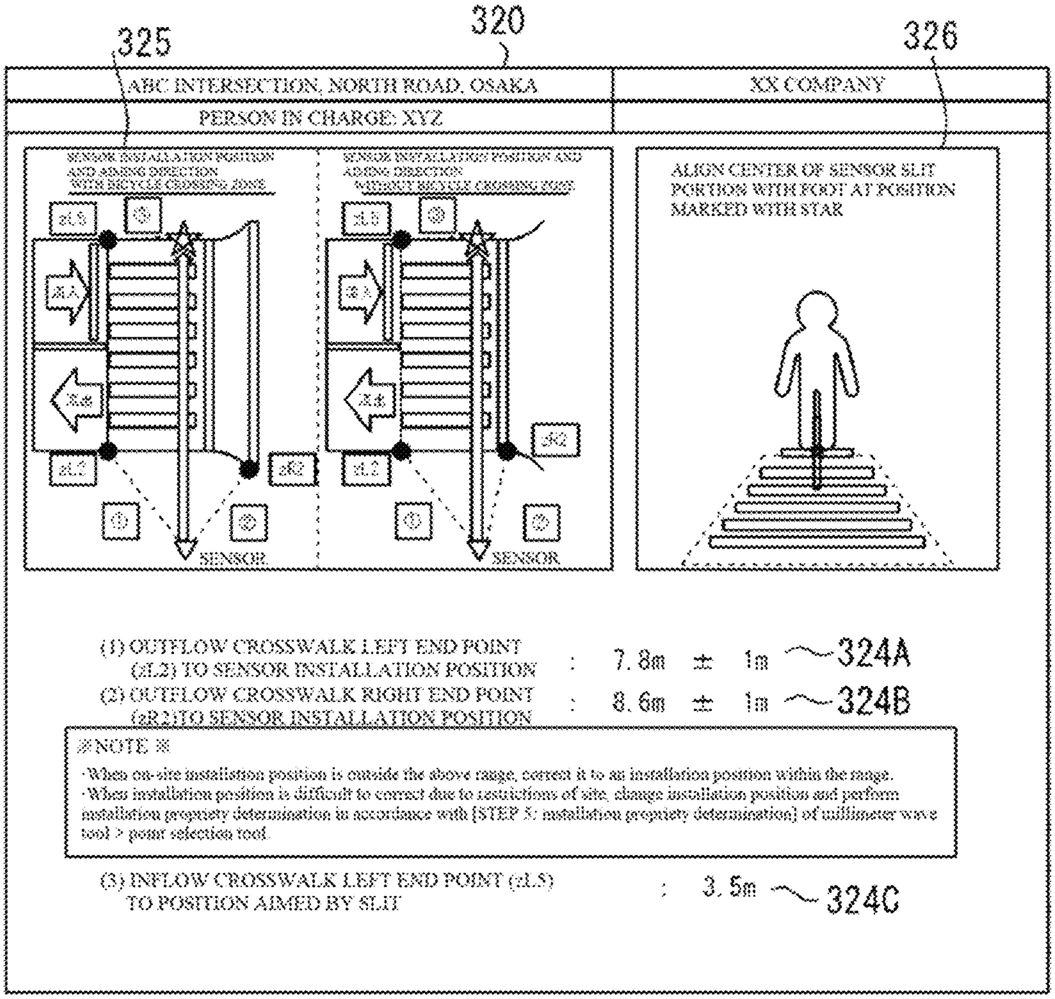
FIG. 12B is a diagram showing a right portion of an example of the form.

FIG. 12A and FIG. 12B are diagrams showing an example of the form. A form 320 includes items used to install infrastructure radio wave sensor 10 at candidate position 306 (hereinafter, referred to as an "installation position 322") determined as an installation position of infrastructure radio wave sensor 10. Form 320 includes image 108A including the crosswalk. A first reference point 321A, a second reference point 321B, a third reference point 321C, and installation position 322 are indicated in image 108A. First reference point 321A and second reference point 321B are used to specify installation position 322. Third reference point 321C is used to specify target position 305.

Referring to FIG. 4A and FIG. 4B, installation position determination screen 300 includes a reference point setting portion 323. Reference point setting portion 323 is an area for the user to set first reference point 321A and second reference point 321B. Reference point setting portion 323 includes a plurality of input boxes for inputting coordinate values of first reference point 321A and second reference point 321B. The user can designate first reference point 321A and second reference point 321B in image 108A by inputting coordinate values in the respective input boxes of reference point setting portion 323 or by clicking and designating any point in displayed image 108A.

First reference point 321A and second reference point 321B are points serving as marks for specifying the installation position at the site. Thus, it is preferable that first reference point 321A and second reference point 321B are points that can be easily recognized by the worker at the site. In the example of FIG. 4A and FIG. 4B, first reference point 321A and second reference point 321B are zebra-crossing lower left end 311G and zebra-crossing lower right end 311H, respectively. Installation support device 100 may set two points among, for example, zebra-crossing upper left end 311C, zebra-crossing upper right end 311D, outflow-boundary upper left end 311E, outflow-boundary upper right end 311F, zebra-crossing lower left end 311G, and zebra-crossing lower right end 311H (see FIG. 5) as respective default points of first reference point 321A and second reference point 321B.

Installation support device 100 may be able to receive designation of third reference point 321C in image 108A from the user. For example, reference point setting portion 323 may include input boxes for inputting the coordinate values of third reference point 321C. The user may be able to designate third reference point 321C in image 108A by inputting coordinate values in the respective input boxes of reference point setting portion 323 or by clicking and designating any point in displayed image 108A.

Third reference point 321C is a point serving as a mark for specifying target position 305 at the site. Thus, it is preferable that third reference point 321C is a point that can be easily recognized by the worker at the site. In the example of FIG. 4A and FIG. 4B, third reference point 321C is zebra-crossing upper left end 311C. Installation support device 100 may set one of zebra-crossing upper left end 311C and zebra-crossing upper right end 311D as a default point of third reference point 321C.

Referring to FIG. 12A and FIG. 12B, form 320 includes a distance 324A from first reference point 321A to installation position 322 and a distance 324B from second reference point 321B to installation position 322. The distance between first reference point 321A and installation position 322, and the distance between second reference point 321B and installation position 322 are calculated based on the scale of image 108A set in advance. Distance 324A includes a reference distance and a tolerance. In the example of FIG. 12A and FIG. 12B, distance 324A is 7.8 m±1 m, the reference distance is 7.8 m, and the tolerance is ±1 m. Distance 324B is 8.6 m±1 m, the reference distance is 8.6 m, and the tolerance is ±1 m. The worker can specify installation position 322 by measuring an actual distance from first reference point 321A and second reference point 321B at the site.

Form 320 includes a guidance item 325 for guiding a method of specifying installation position 322 based on first reference point 321A and second reference point 321B. Guidance item 325 allows the worker to understand a method of specifying installation position 322 based on first reference point 321A and second reference point 321B.

Form 320 includes a distance 324C from third reference point 321C to target position 305. The distance between third reference point 321C and target position 305 is calculated based on the scale of image 108A. In the example of FIG. 12A and FIG. 12B, distance 324C is 3.5 m. The worker can specify target position 305 by measuring an actual distance from third reference point 321C at the site.

Form 320 includes a guidance item 326 for guiding a method of setting an angle of infrastructure radio wave sensor 10. In the example of FIG. 12B, guidance item 326 describes a method of centering the direction of irradiation with a radio wave on target position 305 by means of a sighting device fixed to a housing of infrastructure radio wave sensor 10. Guidance item 326 allows the worker to understand a method of setting the angle of infrastructure radio wave sensor 10.

A method of installing infrastructure radio wave sensor 10 by the worker using form 320 will be described. The worker specifies first reference point 321A and second reference point 321B designated in form 320 at a crosswalk site. The worker measures the distance from first reference point 321A and second reference point 321B, and specifies a position where the distance from first reference point 321A matches distance 324A and the distance from second reference point 321B matches distance 324B as installation position 322.

The worker adjusts the position or angle of structure 50 as necessary and mounts infrastructure radio wave sensor 10 on structure 50 so that infrastructure radio wave sensor 10 is located at installation position 322. At this time, the worker may adjust the mounting position of infrastructure radio wave sensor 10 within the tolerance designated in form 320.

The worker specifies third reference point 321C designated in form 320 at the crosswalk site. The worker measures the distance from third reference point 321C and specifies a position where the distance from third reference point 321C matches distance 324C as target position 305. The worker adjusts the angle of infrastructure radio wave sensor 10 so that the sight is aligned with target position 305 using a sighting device (not shown) attached to infrastructure radio wave sensor 10. The installation of infrastructure radio wave sensor 10 is thus completed.

[4. Operation of Installation Support Device]

Installation support device 100 can execute an image input processing, a planned detection area determination processing, an obstacle setting processing, a first installation position determination support processing, a second installation position determination support processing, and a form output processing, which will be described below, by activating installation support program 107 with processor 101.

Figure 13:
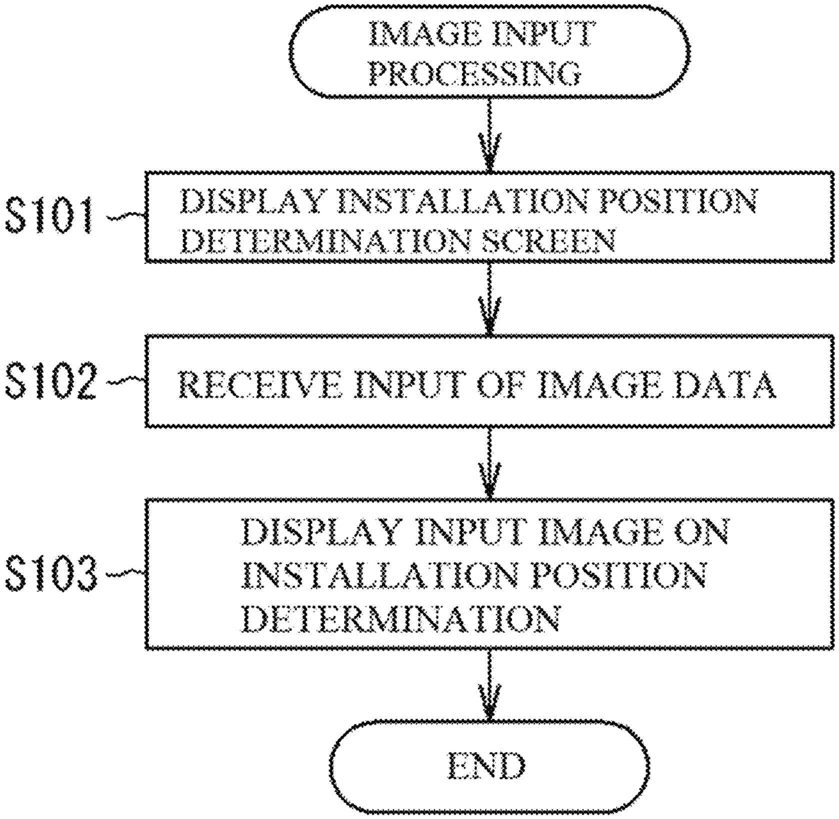
FIG. 13 is a flowchart showing an example of a procedure of image input processing.

FIG. 13 is a flowchart showing an example of a procedure of the image input processing. Processor 101 causes display device 203 to display installation position determination screen 300 (step S101). The user can specify image data 108 to be input by operating input device 201 to select button 302 (see FIG. 4A). Processor 101 receives input of image data 108 (image 108A) (step S102). Processor 101 causes display device 203 to display input image 108A in display area 301 of installation position determination screen 300 (step S103). The image input processing is thus completed.

Figure 14:
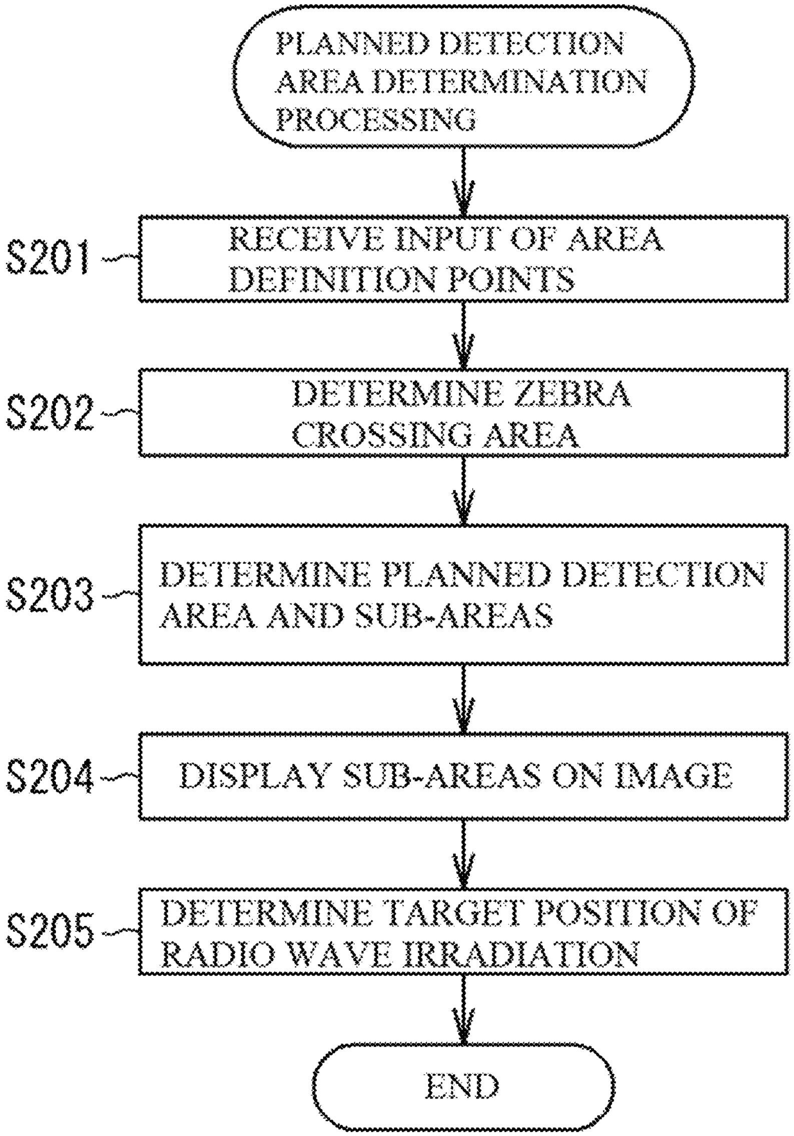
FIG. 14 is a flowchart showing an example of a procedure of planned detection area determination processing.

FIG. 14 is a flowchart showing an example of a procedure of the planned detection area determination processing. The user can input area definition points 311A to 311H by inputting coordinate values in the respective input boxes of zebra crossing setting portion 319 or by clicking and designating points in displayed image 108A. Processor 101 receives input of area definition points 311A to 311H that define zebra crossing area 304 (step S201).

Processor 101 determines zebra crossing area 304 (see FIG. 5) based on input area definition points 311A to 311H (step S202). Processor 101 determines planned detection area 303, inflow standby area 303A, inflow zebra crossing area 303B, outflow zebra crossing area 303C, and outflow standby area 303D based on zebra crossing area 304 (step S203).

Processor 101 causes display device 203 to display the sub-areas, that is, inflow standby area 303A, inflow zebra crossing area 303B, outflow zebra crossing area 303C, and outflow standby area 303D to be superimposed on image 108A (step S204).

Processor 101 determines target position 305 of irradiation with a radio wave, for example, based on the sub-areas or based on an input from the user (step S205). The planned detection area determination processing is thus completed.

Figure 15:
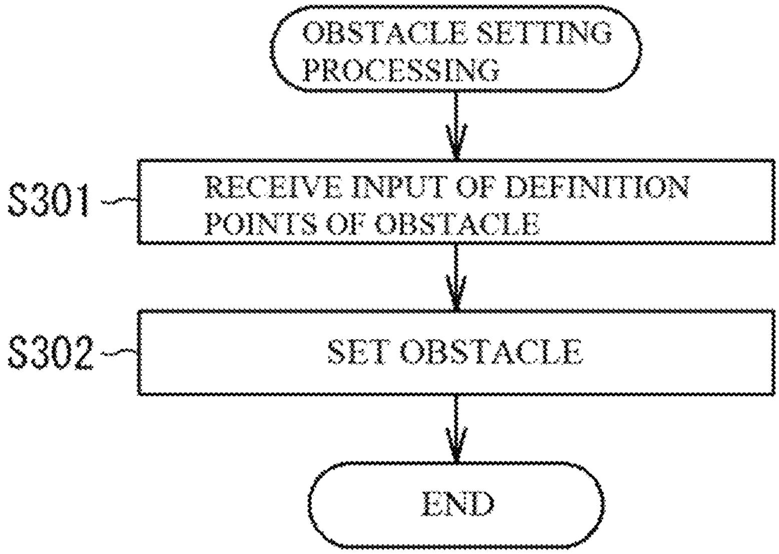
FIG. 15 is a flowchart showing an example of a procedure of obstacle setting processing.

FIG. 15 is a flowchart showing an example of a procedure of the obstacle setting processing. The user can input the definition points of the obstacles to installation support device 100 by inputting coordinate values to the respective input boxes of obstacle setting portion 313 or by clicking and designating the definition points of the obstacles in displayed image 108A. Processor 101 receives an input of the definition points of the obstacles (step S301). Processor 101 sets the obstacles of irradiation with a radio wave based on the input definition points (step S302). The obstacle setting processing is thus completed.

Figure 16:
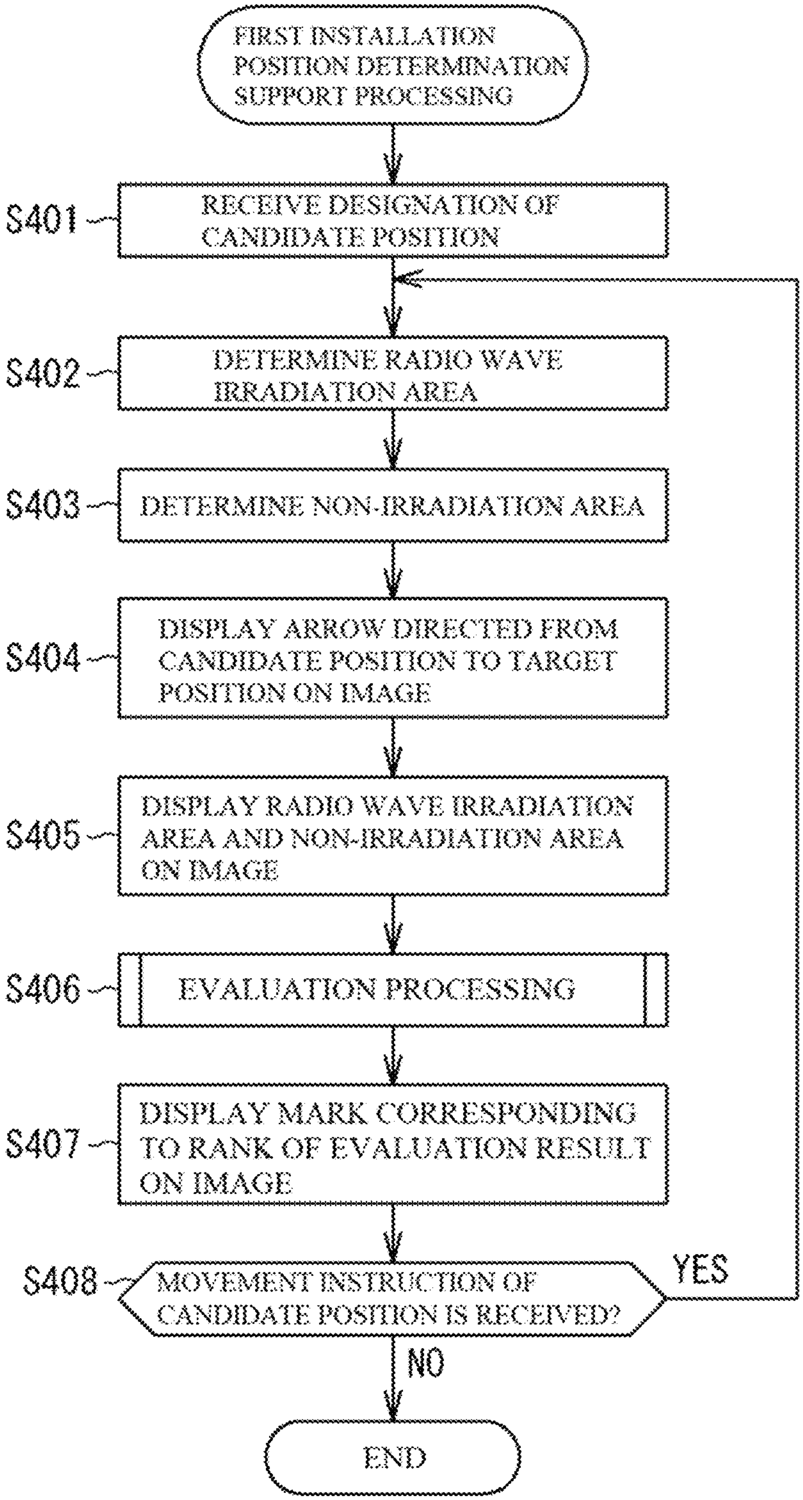
FIG. 16 is a flowchart showing an example of a procedure of first installation position determination support processing.

FIG. 16 is a flowchart showing an example of a procedure of the first installation position determination support processing. The user can designate candidate position 306 by operating input device 201 and clicking a desired point in image 108A, for example. Processor 101 receives designation of candidate position 306 from the user (step S401).

Processor 101 determines radio wave irradiation area 307 based on candidate position 306 and target position 305 (step S402). Processor 101 further determines non-irradiation area 314A and non-irradiation area 314B based on candidate position 306 and the set obstacles (traffic signal poles 309A and 309B) (step S403).

Processor 101 causes display device 203 to display arrow 308 directed from candidate position 306 to target position 305 to be superimposed on image 108A (step S404). Processor 101 further displays radio wave irradiation area 307, non-irradiation area 314A, and non-irradiation area 314B to be superimposed on image 108A (step S405).

Figure 17:
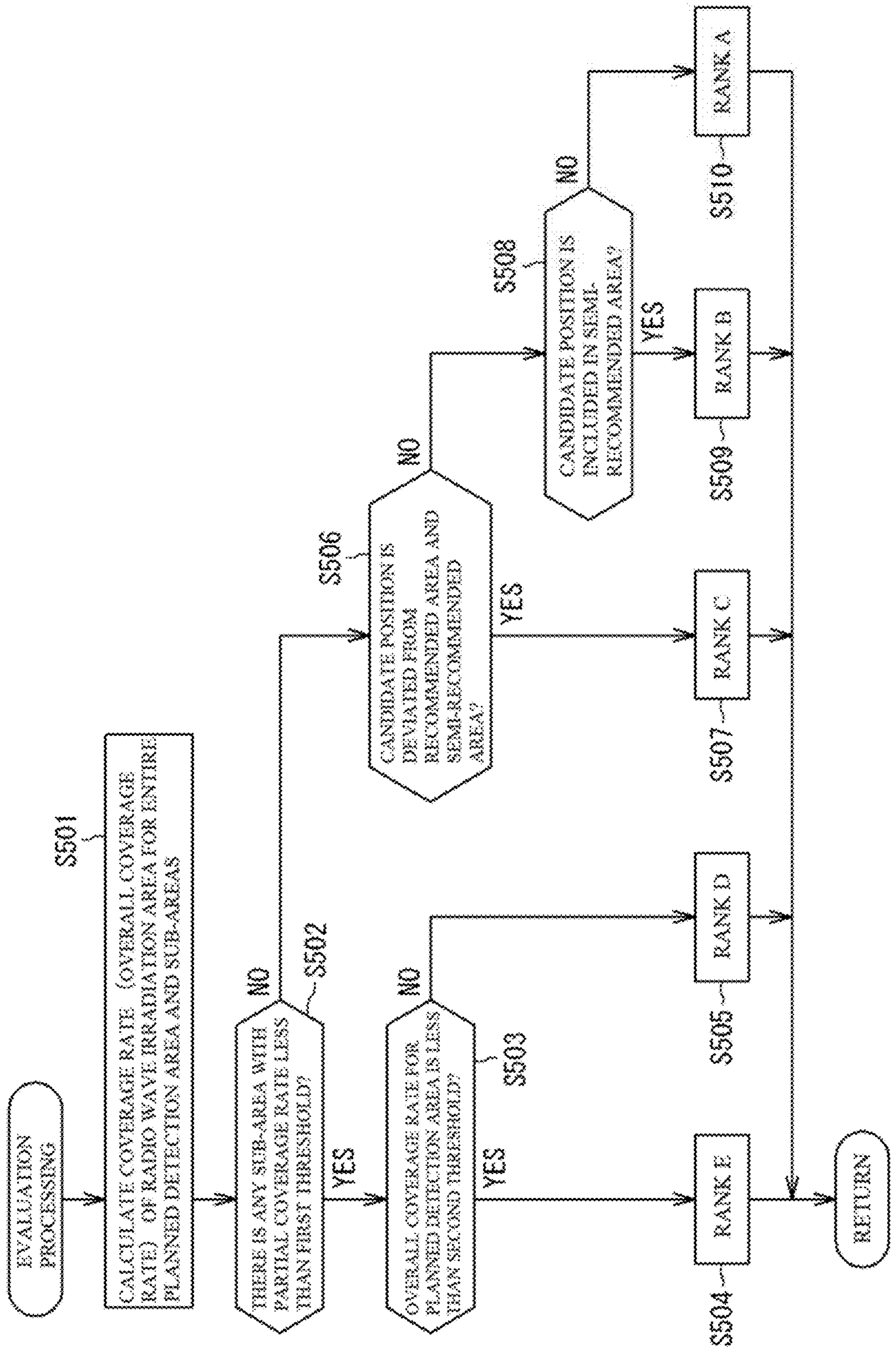
FIG. 17 is a flowchart showing an example of a procedure of evaluation processing.

Processor 101 executes evaluation processing for evaluating candidate position 306 (step S406). FIG. 17 is a flowchart showing an example of a procedure of the evaluation processing.

Processor 101 calculates a coverage rate (overall coverage rate) of radio wave irradiation area 307 for entire planned detection area 303, and calculates a coverage rate (partial coverage rate) of radio wave irradiation area 307 for each of the sub-areas (step S501).

Processor 101 determines whether or not there is any sub-area in which the partial coverage rate is less than the first threshold (step S502).

When there is any sub-area in which the partial coverage rate is less than the first threshold (YES in step S502), processor 101 determines whether or not the overall coverage rate is less than the second threshold (step S503).

When the overall coverage rate is less than the second threshold (YES in step S503), processor 101 determines the rank of candidate position 306 to be "E" (step S504).

When the overall coverage rate is equal to or greater than the second threshold (NO in step S503), processor 101 determines the rank of candidate position 306 to be "D" (step S505).

When the partial coverage rates for all the sub-areas are equal to or greater than the first threshold (NO in step S502), processor 101 determines whether or not candidate position 306 is deviated from recommended area 315A and semi-recommended area 315B, that is, whether or not candidate position 306 is included in non-recommended area 315C (step S506).

When candidate position 306 is included in non-recommended area 315C (YES in step S506), processor 101 determines the rank of candidate position 306 to be "C" (step S507).

When candidate position 306 is included in recommended area 315A or semi-recommended area 315B (NO in step S506), processor 101 determines whether or not candidate position 306 is included in semi-recommended area 315B (step S508).

When candidate position 306 is included in semi-recommended area 315B (YES in step S508), processor 101 determines the rank of candidate position 306 to be "B" (step S509).

When candidate position 306 is deviated from semi-recommended area 315B, that is, when candidate position 306 is included in recommended area 315A (NO in step S508), processor 101 determines the rank of candidate position 306 to be "A" (step S510). The evaluation processing is thus completed.

Referring to FIG. 16, processor 101 causes display device 203 to display a mark corresponding to the rank of the evaluation result at candidate position 306 in image 108A (step S407). Processor 101 causes display device 203 to display, for example, the coordinate values and the rank of candidate position 306 in evaluation result display portion 317 of installation position determination screen 300A.

The user can input a movement instruction of candidate position 306 to installation support device 100 by operating input device 201. Processor 101 determines whether or not the movement instruction of candidate position 306 has been received from the user (step S408). When processor 101 receives the movement instruction of candidate position 306 from the user (YES in step S408), processor 101 returns the processing to step S402. This updates the display of radio wave irradiation area 307, non-irradiation area 314A, and non-irradiation area 314B, and the rank of new candidate position 306 is determined.

When the movement instruction of candidate position 306 is not provided from the user to installation support device 100 (NO in step S408), the first installation position determination support processing is completed.

Figure 18:
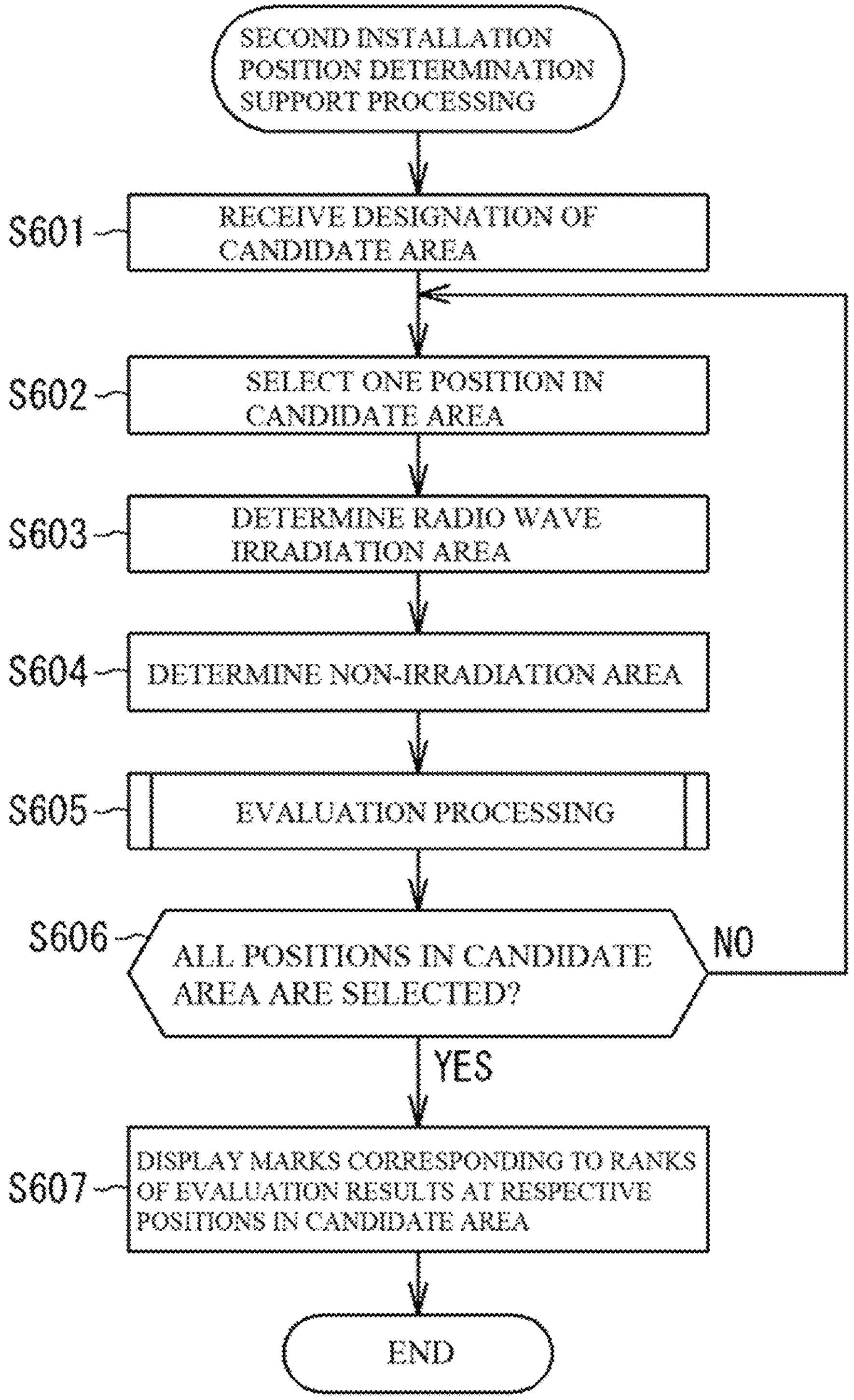
FIG. 18 is a flowchart showing an example of a procedure of second installation position determination support processing.

FIG. 18 is a flowchart showing an example of a procedure of the second installation position determination support processing. The user can specify candidate area 318 by operating input device 201 to designate a desired area in image 108A by drag-and-drop. Processor 101 receives designation of candidate area 318 from the user (step S601).

Processor 101 selects one position (candidate position 306) in candidate area 318 (step S602).

Processor 101 determines radio wave irradiation area 307 based on selected candidate position 306 and target position 305 (step S603). Processor 101 further determines non-irradiation area 314A and non-irradiation area 314B based on selected candidate position 306 and the set obstacles (traffic signal poles 309A and 309B) (step S604).

Processor 101 executes the evaluation processing described above (step S605).

Processor 101 determines whether or not all the positions in candidate area 318 have been selected (step S606). When there is any unselected position (NO in step S606), processor 101 returns the processing to step S602 and selects one of the unselected positions (step S602). Processor 101 executes the processing in step S603 and the subsequent steps.

When all the positions in candidate area 318 have been selected (YES in step S606), processor 101 causes display device 203 to display marks corresponding to the ranks of the evaluation results at the respective positions in candidate area 318 on image 108A (step S607). Processor 101 causes display device 203 to display, for example, a list of the coordinate values and the ranks of respective candidate positions 306 in evaluation result display portion 317 of installation position determination screen 300B. The second installation position determination support processing is thus completed.

Figure 19:
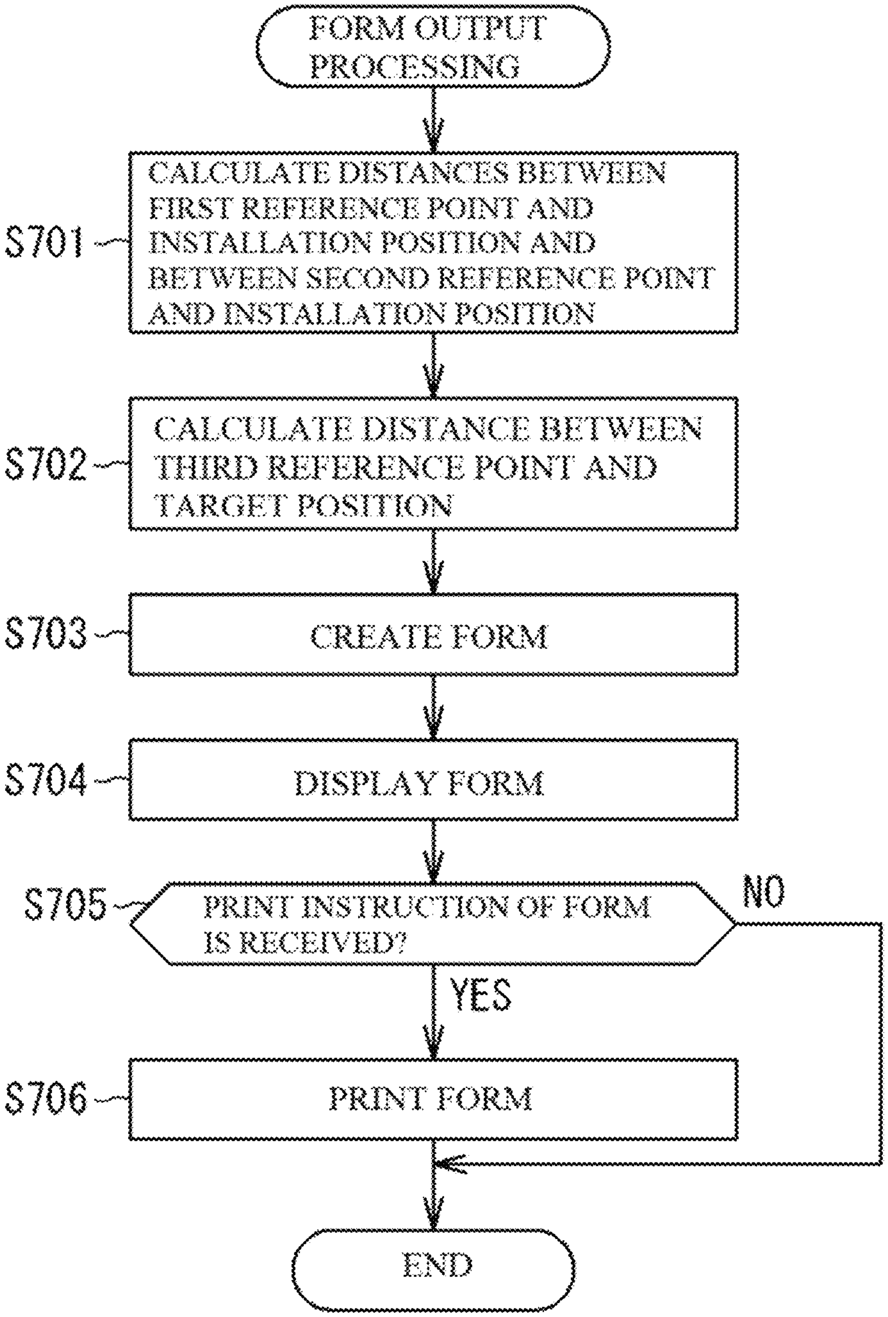
FIG. 19 is a flowchart showing an example of a procedure of form output processing.

FIG. 19 is a flowchart showing an example of a procedure of the form output processing. After the evaluation results of candidate positions 306 are output, the user can input a form creation instruction to installation support device 100. When processor 101 receives the form creation instruction from the user, processor 101 calculates a distance between first reference point 321A and installation position 322, and a distance between second reference point 321B and installation position 322 based on a distance between first reference point 321A and installation position 322 and a distance between second reference point 321B and installation position 322 on image 108A, and the scale of image 108A (step S701).

Processor 101 calculates a distance between third reference point 321C and target position 305 based on a distance between third reference point 321C and target position 305 on image 108A and the scale of image 108A (step S702).

Processor 101 creates form 320 using installation position 322, first reference point 321A, second reference point 321B, third reference point 321C, the calculated distance between first reference point 321A and installation position 322 and between second reference point 321B and installation position 322, and the distance between third reference point 321C and target position 305 (step S703). Processor 101 causes display device 203 to display created form 320 (step S704).

The user can input a print instruction of displayed form 320 to installation support device 100. Processor 101 determines whether or not the print instruction of form 320 has been received from the user (step S705).

When processor 101 has received the print instruction of form 320 (YES in step S705), processor 101 outputs a print command of the form and data for printing to printer 202, and causes printer 202 to print the form (step S706). Processor 101 completes the form output processing after causing printer 202 to print form 320. Processor 101 terminates the form output processing without causing printer 202 to print form 320 when not receiving the print instruction of form 320 from the user.

[5. Modification]

In the above-described embodiments, installation support device 100 evaluates candidate position 306 based on the overlap between radio wave irradiation area 307 and planned detection area 303, but the present invention is not limited thereto. For example, installation support device 100 may evaluate candidate position 306 based on the overlap between radio wave irradiation area 307 and zebra crossing area 304.

[6. Supplemental]

The embodiments disclosed herein are illustrative and non-restrictive in all respects. The scope of the present invention is defined by the appended claims rather than the embodiments described above, and includes all modifications within the scope and meaning equivalent to the appended claims.

REFERENCE SIGNS LIST

10 infrastructure radio wave sensor (radio wave sensor)
20 crosswalk
30 detection area
40 radio wave irradiation area
50 structure
51 pole
52 arm
100 installation support device
101 processor
102 non-volatile memory
103 volatile memory
104 input/output interface (I/O)
105 graphics controller
106 communication interface (communication I/F)
107 installation support program
108 image data
108A image
111 image input unit
112 display control unit
113 area determination unit
114 target position determination unit
115 candidate position designation unit
116 radio wave irradiation area determination unit
117 obstacle setting unit
118 non-irradiation area determination unit
119 evaluation unit
120 form creation unit
121 output unit
201 input device
202 printer
203 display device
300, 300A, 300B installation position determination screen
301 display area
302 button
303 planned detection area
303A inflow standby area
303B inflow zebra crossing area
303C outflow zebra crossing area
303D outflow standby area
304 zebra crossing area
305 target position
306, 306A, 306B candidate position
307, 307A, 307B radio wave irradiation area
308, 308A, 308B arrow
309A, 309B traffic signal pole
310A inflow lane
310B outflow lane
311 area definition point
311A zebra-crossing center upper end (area definition point)
311B zebra-crossing center lower end (area definition point)
311C zebra-crossing upper left end (area definition point)
311D zebra-crossing upper right end (area definition point)
311E outflow-boundary upper left end (area definition point)
311F outflow-boundary upper right end (area definition point)
311G zebra-crossing lower left end (area definition point)
311H zebra-crossing lower right end (area definition point)
312A, 312B sidewalk
313 obstacle setting portion
314A, 314B, 314AA, 314AB, 314BA, 314BB non-irradiation area
315A recommended area
315B semi-recommended area
315C non-recommended area
317 evaluation result display portion
318 candidate area
319 zebra crossing setting portion
320 form
321A first reference point
321B second reference point
321C third reference point
322 installation position
323 reference point setting portion
324A, 324B, 324C distance
325,326 guidance item

The invention claimed is:

1. An installation support device for a radio wave sensor, the installation support device comprising:

a target position determination processor configured to determine a target position of irradiation with a radio wave by the radio wave sensor in an image including a crosswalk;

a candidate position designation processor configured to receive designation of a candidate position in the image from a user, the candidate position being a candidate installation position of the radio wave sensor;

an evaluation processor configured to evaluate the candidate position based on a radio wave irradiation area and a first area of the crosswalk in the image, the radio wave irradiation area being determined based on the target position and the candidate position; and a display control processor configured to cause a display device to display an evaluation result obtained by the evaluation processor.

2. The installation support device for a radio wave sensor according to claim 1, wherein the first area is a planned detection area planned to be set by the radio wave sensor as a detection area for the radio wave sensor to detect an object, and the installation support device further comprises an area determination processor configured to determine the planned detection area based on the image.

3. The installation support device for a radio wave sensor according to claim 2, wherein the area determination processor is configured to receive designation of a point for defining the planned detection area in the image from the user and determine the planned detection area based on the point.

4. The installation support device for a radio wave sensor according to claim 2, wherein the evaluation processor is configured to calculate an overall coverage rate and evaluate the candidate position based on the overall coverage rate, the overall coverage rate being a ratio of a portion where the planned detection area and the radio wave irradiation area overlap each other to the planned detection area.

5. The installation support device for a radio wave sensor according to claim 4, wherein the evaluation processor is configured to determine a rank of the candidate position, based on a comparison between the overall coverage rate and a threshold, and the display control processor is configured to cause the display device to display the evaluation result, the evaluation result including the rank.

6. The installation support device for a radio wave sensor according to claim 2, wherein the area determination processor is configured to determine the planned detection area, the planned detection area including a plurality of sub-areas, and the evaluation processor is configured to calculate a partial coverage rate for each of the plurality of sub-areas included in the planned detection area and determine a rank of the candidate position, based on the partial coverage rate for each of the plurality of sub-areas, the partial coverage rate being a ratio of a portion where each of the plurality of sub-areas and the radio wave irradiation area overlap each other to each of the sub-areas.

7. The installation support device for a radio wave sensor according to claim 2, wherein the evaluation processor is configured to determine a rank of the candidate position, based on a positional relationship between the candidate position and the planned detection area.

8. The installation support device for a radio wave sensor according to claim 1, wherein the candidate position designation processor is configured to receive designation of a plurality of the candidate positions from the user, the evaluation processor is configured to evaluate each of the plurality of candidate positions, and the display control processor is configured to cause the display device to display an evaluation result of each of the plurality of candidate positions.

9. The installation support device for a radio wave sensor according to claim 8, wherein the candidate position designation processor is configured to receive designation of a second area from the user, the second area including the plurality of candidate positions in the image, and the display control processor is configured to display the evaluation result of each of the plurality of candidate positions in the second area.

10. The installation support device for a radio wave sensor according to claim 1, further comprising:

a form creation processor configured to create a form, based on the target position determined by the target position determination processor and the candidate position received by the candidate position designation processor, the form being for installing the radio wave sensor at the candidate position; and an output processor configured to output the form created by the form creation processor.

11. A non-transitory computer-readable recording medium recorded with a computer program for causing a computer to support installation of a radio wave sensor, the computer program causing the computer to function as:

a target position determination processor configured to determine a target position of irradiation with a radio wave by the radio wave sensor in an image including a crosswalk;

a candidate position designation processor configured to receive designation of a candidate position in the image from a user, the candidate position being a candidate installation position of the radio wave sensor;

an evaluation processor configured to evaluate the candidate position based on a radio wave irradiation area and a first area of the crosswalk in the image, the radio wave irradiation area being determined based on the target position and the candidate position; and a display control processor configured to cause a display device to display an evaluation result obtained by the evaluation processor.

12. A method of determining an installation position of a radio wave sensor, the method comprising:

designating a candidate position in an image including a crosswalk displayed on an installation support device configured to support installation of the radio wave sensor, the candidate position being a candidate installation position of the radio wave sensor; and determining whether to determine the candidate position as an installation position of the radio wave sensor, based on a result of evaluation of the candidate position by the installation support device based on a radio wave irradiation area and a first area of the crosswalk in the image, the radio wave irradiation area being determined based on the candidate position and a target position of irradiation with a radio wave by the radio wave sensor.

13. A method of supporting installation of a radio wave sensor, the method comprising:

designating a target position of irradiation with a radio wave by the radio wave sensor in an image including a crosswalk;

designating a candidate position in the image, the candidate position being a candidate installation position of the radio wave sensor;

causing an installation support device configured to support installation of the radio wave sensor to perform an evaluation of the candidate position based on a radio wave irradiation area and a first area of the crosswalk in the image, the radio wave irradiation area being determined based on the target position and the candidate position; and causing a display device to display a result of the evaluation.

* * * * *